(12) United States Patent
Fujimoto

(10) Patent No.: US 7,203,862 B2
(45) Date of Patent: Apr. 10, 2007

(54) METHODS FOR CONTROLLING STORAGE DEVICES CONTROLLING APPARATUSES

(75) Inventor: Shuji Fujimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 411 days.

(21) Appl. No.: 10/649,100

(22) Filed: Aug. 26, 2003

(65) Prior Publication Data

US 2004/0153740 A1 Aug. 5, 2004

(30) Foreign Application Priority Data

Jan. 31, 2003 (JP) ............................. 2003-025074

(51) Int. Cl.
*G06F 11/00* (2006.01)
(52) U.S. Cl. ...................... 714/6; 714/5; 714/9; 714/42
(58) Field of Classification Search .................. 714/5, 714/6, 9, 42
See application file for complete search history.

(56) References Cited

U.S. PATENT DOCUMENTS

| | | | | |
|---|---|---|---|---|
| 5,155,845 A | * | 10/1992 | Beal et al. ....................... | 714/6 |
| 5,544,347 A | * | 8/1996 | Yanai et al. .................... | 714/6 |
| 5,574,863 A | * | 11/1996 | Nelson et al. .................. | 714/6 |
| 5,579,222 A | | 11/1996 | Bains et al. | |
| 5,636,341 A | | 6/1997 | Matsushita et al. | |
| 5,668,943 A | | 9/1997 | Attanasio et al. | |
| 5,671,412 A | | 9/1997 | Christiano | |
| 5,720,028 A | * | 2/1998 | Matsumoto et al. ........... | 714/6 |
| 5,729,763 A | | 3/1998 | Leshem | |
| 5,752,041 A | | 5/1998 | Fosdick | |
| 5,774,643 A | * | 6/1998 | Lubbers et al. ................ | 714/6 |
| 5,815,652 A | | 9/1998 | Ote et al. | |
| 5,819,054 A | | 10/1998 | Ninomiya et al. | |
| 5,845,061 A | | 12/1998 | Miyamoto et al. | |
| 5,903,650 A | | 5/1999 | Ross et al. | |
| 6,009,401 A | | 12/1999 | Horstmann | |
| 6,169,976 B1 | | 1/2001 | Colosso | |
| 6,189,146 B1 | | 2/2001 | Misra et al. | |
| 6,243,829 B1 | | 6/2001 | Chan | |
| 6,356,978 B1 | | 3/2002 | Kobayashi et al. | |
| 6,397,292 B1 | * | 5/2002 | Venkatesh et al. ............. | 714/6 |
| 6,401,223 B1 | * | 6/2002 | DePenning .................. | 714/42 |
| 6,408,400 B2 | | 6/2002 | Taketa et al. | |

(Continued)

FOREIGN PATENT DOCUMENTS

JP 2002-279165 A 9/2002

*Primary Examiner*—Robert Beausoliel
*Assistant Examiner*—Joseph D Manoskey
(74) *Attorney, Agent, or Firm*—Townsend and Townsend and Crew LLP

(57) ABSTRACT

A storage device controller including: channel control portions each including a circuit board on which a file access processing portion for receiving file-by-file data input/output requests sent from information processors and an I/O processor for outputting I/O requests corresponding to the data input/output requests to storage devices are formed, the channel control portions being classified into groups for the sake of fail-over; and a device for storing data updated by each of the channel control portions and handed over at the time of the fail-over in a shared volume which is a storage region logically set on physical storage regions provided by the storage devices and which can be accessed commonly by any other channel control portion belonging to the same group as the channel control portion updating the data.

16 Claims, 16 Drawing Sheets

U.S. PATENT DOCUMENTS

| | | |
|---|---|---|
| 6,523,138 B1 * | 2/2003 | Natsume et al. ............... 714/9 |
| 6,539,461 B2 | 3/2003 | Suzuki et al. |
| 6,574,612 B1 | 6/2003 | Baratti et al. |
| 6,633,835 B1 | 10/2003 | Moran et al. |
| 6,732,289 B1 | 5/2004 | Talagala et al. |
| 6,745,287 B2 | 6/2004 | Fujimoto et al. |
| 6,766,359 B1 | 7/2004 | Oliveira et al. |
| 6,772,306 B2 | 8/2004 | Suzuki et al. |
| 6,789,112 B1 | 9/2004 | Freeman et al. |
| 6,801,940 B1 | 10/2004 | Moran et al. |
| 6,801,983 B2 | 10/2004 | Abe et al. |
| 6,851,020 B2 | 2/2005 | Matsumoto et al. |
| 6,874,100 B2 | 3/2005 | Rauscher |
| 2001/0004754 A1 * | 6/2001 | Murayama ..................... 714/6 |
| 2001/0049717 A1 | 12/2001 | Freeman et al. |
| 2002/0069172 A1 | 6/2002 | Omshehe et al. |
| 2002/0124140 A1 | 9/2002 | Kawaguchi et al. |
| 2002/0188704 A1 | 12/2002 | Gold et al. |
| 2003/0018927 A1 | 1/2003 | Gadir et al. |
| 2003/0037278 A1 | 2/2003 | Olarig |
| 2003/0084306 A1 | 5/2003 | Abburi et al. |
| 2003/0135782 A1 * | 7/2003 | Matsunami et al. ........... 714/5 |
| 2003/0163712 A1 | 8/2003 | LaMothe et al. |
| 2003/0204597 A1 | 10/2003 | Arakawa et al. |
| 2004/0049710 A1 | 3/2004 | Ashmore et al. |
| 2004/0054930 A1 | 3/2004 | Walker et al. |
| 2004/0098348 A1 | 5/2004 | Kawasaki et al. |
| 2004/0133634 A1 * | 7/2004 | Luke et al. ................. 709/203 |
| 2004/0153416 A1 | 8/2004 | Fujimoto |
| 2004/0153721 A1 | 8/2004 | Fujimoto |
| 2004/0153914 A1 | 8/2004 | El-Batal |

* cited by examiner

PHYSICAL DISK MANAGEMENT TABLE

162a

| DISK NUMBER | CAPACITY | RAID | STATUS OF USE |
|---|---|---|---|
| #001 | 100GB | 5 | IN USE |
| #002 | 100GB | 5 | IN USE |
| #003 | 100GB | 5 | IN USE |
| #004 | 100GB | 5 | IN USE |
| #005 | 100GB | 5 | IN USE |
| #006 | 50GB | — | UNUSED |
| ⋮ | ⋮ | ⋮ | ⋮ |

LU MANAGEMENT TABLE

162b

| LU NUMBER | PHYSICAL DISK | CAPACITY | RAID |
|---|---|---|---|
| #1 | #001,#002,#003,#004,#005 | 100GB | 5 |
| #2 | #001,#002,#003,#004,#005 | 300GB | 5 |
| #3 | #006,#007, | 200GB | 1 |
| ⋮ | ⋮ | ⋮ | ⋮ |

META-DATA

| FILENAME | TOP ADDRESS | CAPACITY | OWNER | UPDATE TIME |
|---|---|---|---|---|
| A | 7BSA | 200MB | X | 0 : 00 |
| B | 05BF | 50MB | X | 7 : 57 |
| C | 1F30 | 100MB | Y | 9 : 15 |
| D | 470B | 100MB | Z | 15 : 20 |
| ⋮ | ⋮ | ⋮ | ⋮ | ⋮ |

FILE LOCK TABLE

| FILENAME | STATUS OF LOCK |
|---|---|
| A | LOCKED |
| B | — |
| C | — |
| D | LOCKED |
| ⋮ | ⋮ |

722

LU LOCK TABLE

| LU | STATUS OF LOCK |
|---|---|
| SHARED | — |
| 1 | LOCKED |
| 2 | — |
| ⋮ | ⋮ |

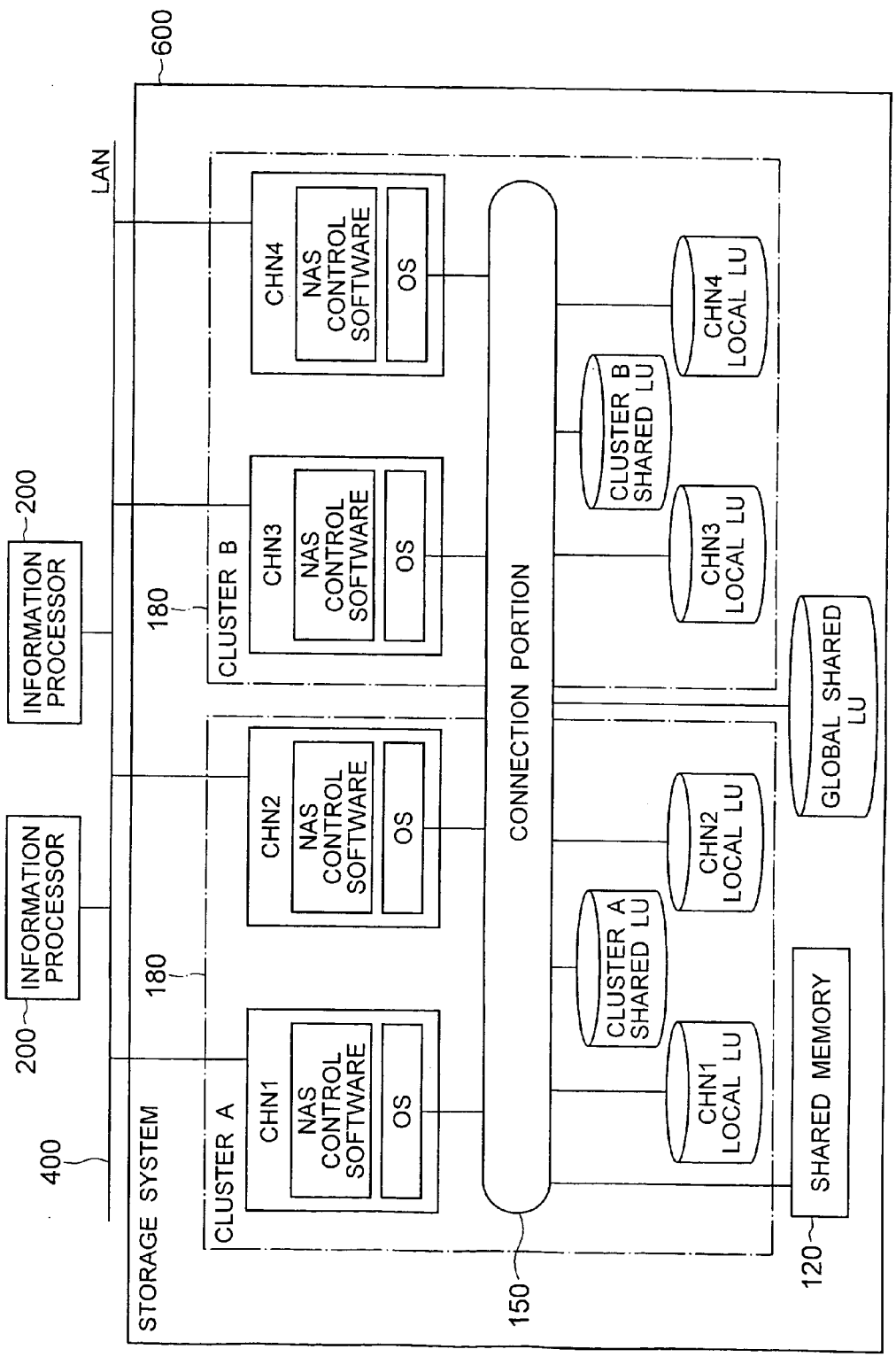

FIG. 16

| CONTROL INFORMATION | DATA SYNC TYPE | SYNCHRONIZING METHOD | SYNCHRONOUS DATA | REFLECTION IN LOCAL LU |
|---|---|---|---|---|
| NFS USER DATA | SYNCHRONIZATION IN CLUSTER | NETWORK | /etc/passwd | — |
| CIFS USER DATA | SYNCHRONIZATION IN CLUSTER | SHARED LU | /etc/smbpasswd | NO |
| SYSTEM ADMINISTRATOR DATA | SYNCHRONIZATION IN STORAGE SYSTEM | — | — | NO |
| FAIL-OVER HEART BEAT | SYNCHRONIZATION IN CLUSTER | SHARED MEMORY | HEALTH CHECK (NORMAL CONFIRMATION RESPONSE) | NO |
| IP ADDRESS OF CHN | PECULIAR TO SYSTEM | — | /etc/network/interfases | — |
| NAS FILE LOCK INFORMATION | SYNCHRONIZATION IN CLUSTER | SHARED LU | HOST NAME | NO |
| CLUSTER CONTROL INFORMATION | SYNCHRONIZATION IN CLUSTER | SHARED LU | CLUSTER DATABASE | YES |

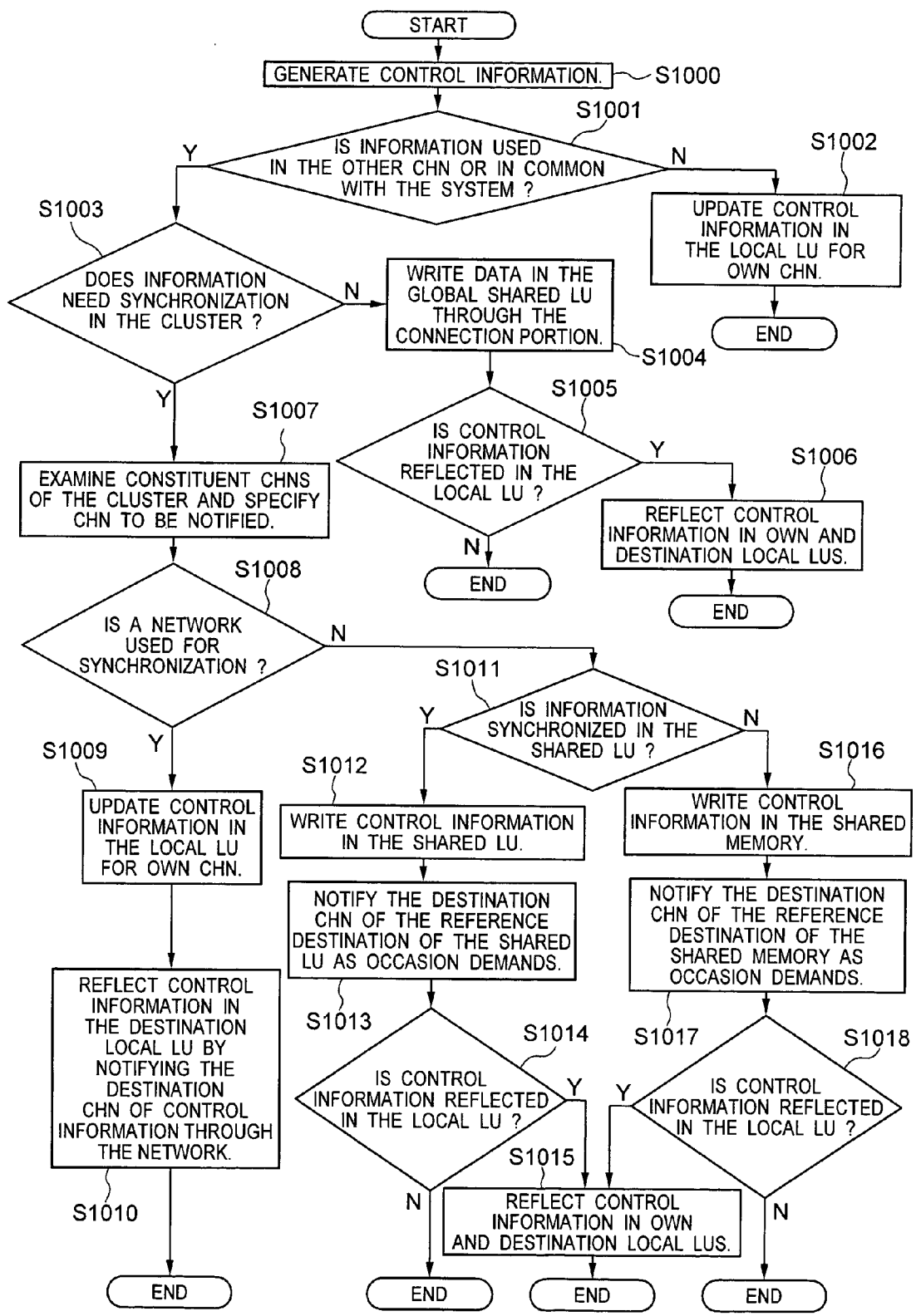

FIG. 18

| CONTROL INFORMATION | STORAGE DESTINATION OF DATA | NOTICE OF DATA |
|---|---|---|
| NFS USER DATA | LOCAL LU | — |
| CIFS USER DATA | SHARED LU | YES |
| SYSTEM ADMINISTRATOR DATA | GLOBAL SHARED LU | NO |
| FAIL-OVER HEART BEAT | SHARED MEMORY | NO |
| NFS FILE LOCK INFORMATION | SHARED LU | NO |
| CLUSTER CONTROL INFORMATION | LOCAL LU | NO |

METHODS FOR CONTROLLING STORAGE DEVICES CONTROLLING APPARATUSES

BACKGROUND OF THE INVENTION

The quantity of data used in a computer system has increased rapidly in recent years. As a storage system for managing such data, a large-scale storage system managed by a RAID (Redundant Arrays of Inexpensive Disks) method for providing huge storage resources as called mid-range class or enterprise class has attracted public attention recently.

A storage system called NAS (Network Attached Storage) has been also developed so that the storage system and each information processor are connected to each other by a network using a protocol such as TCP/IP (Transmission Control Protocol/Internet Protocol) etc., to achieve access at file level from the information processor (e.g., JP-A-8-212095).

On the other hand, a technique called fail-over has been developed so that, even if failure occurs in an information processor using a storage region provided by a storage system, another information processor can be used in place of the failed information processor for performing processing to continue provision of service by the information processor.

SUMMARY OF THE INVENTION

In fail-over in the conventional storage system, there was however no common storage region extending over information processors. Accordingly, when fail-over was to be carried out, a handover process had to be made so that data in the storage region used by the original information processor could be used by the substitute information processor. Furthermore, because data in the storage region were handed over after failure occurred in the information processor, a time lag was generated before the substitution started. In addition, the process for handing over data was troublesome.

The invention is developed in consideration of the problems and an object of the invention is to provide a storage device controller and a program for the storage device controller.

To solve the problems, the invention provides a storage device controller including: channel control portions each including a circuit board on which a file access processing portion for receiving file-by-file data input/output requests sent from information processors and an I/O processor for outputting I/O requests corresponding to the data input/output requests to storage devices are formed, the channel control portions being classified into groups for the sake of fail-over; and means for storing data updated by each of the channel control portions and handed over at the time of the fail-over in a shared volume which is a storage region logically set on physical storage regions provided by the storage devices and which can be accessed commonly by any other channel control portion belonging to the same group as the channel control portion updating the data.

Incidentally, each of the information processors is, for example, a personal computer or a main frame computer that accesses a storage system having the storage device controller configured as described above through an LAN (Local Area Network). The function of each file access processing portion is provided by an operating system executed on a CPU and a software such as NFS (Network File System) operated on the operating system. Each storage device is a disk drive such as a hard disk device. Each I/O processor is made of an IC (Integrated Circuit) which is a hardware element independent of the CPU that is a hardware element of the file access processing portion. The I/O processors control communications between the file access processing portions and disk control portions. The disk control portions control the storage devices to write/read data in/from the storage devices respectively.

BRIEF DESCRIPTION OF THE DRAWINGS

FIG. 12 is a view showing meta-data in this embodiment;

FIG. 13 is a view showing lock tables in this embodiment;

FIG. 15 is a diagram showing local LUs, shared LUs and a global shared LU in the storage system in this embodiment;

FIG. 16 is a table showing data to be handed over at the time of fail-over and synchronizing methods in this embodiment;

FIG. 17 is a flow chart showing a process for determining the synchronizing methods for data to be handed over at the time of fail-over in this embodiment;

FIG. 18 is a table for determining destinations for referring to data to be handed over at the time of fail-over in this embodiment;

DETAILED DESCRIPTION OF THE EMBODIMENTS

Embodiments of the invention will be described below in detail with reference to the drawings.

Figure 1:
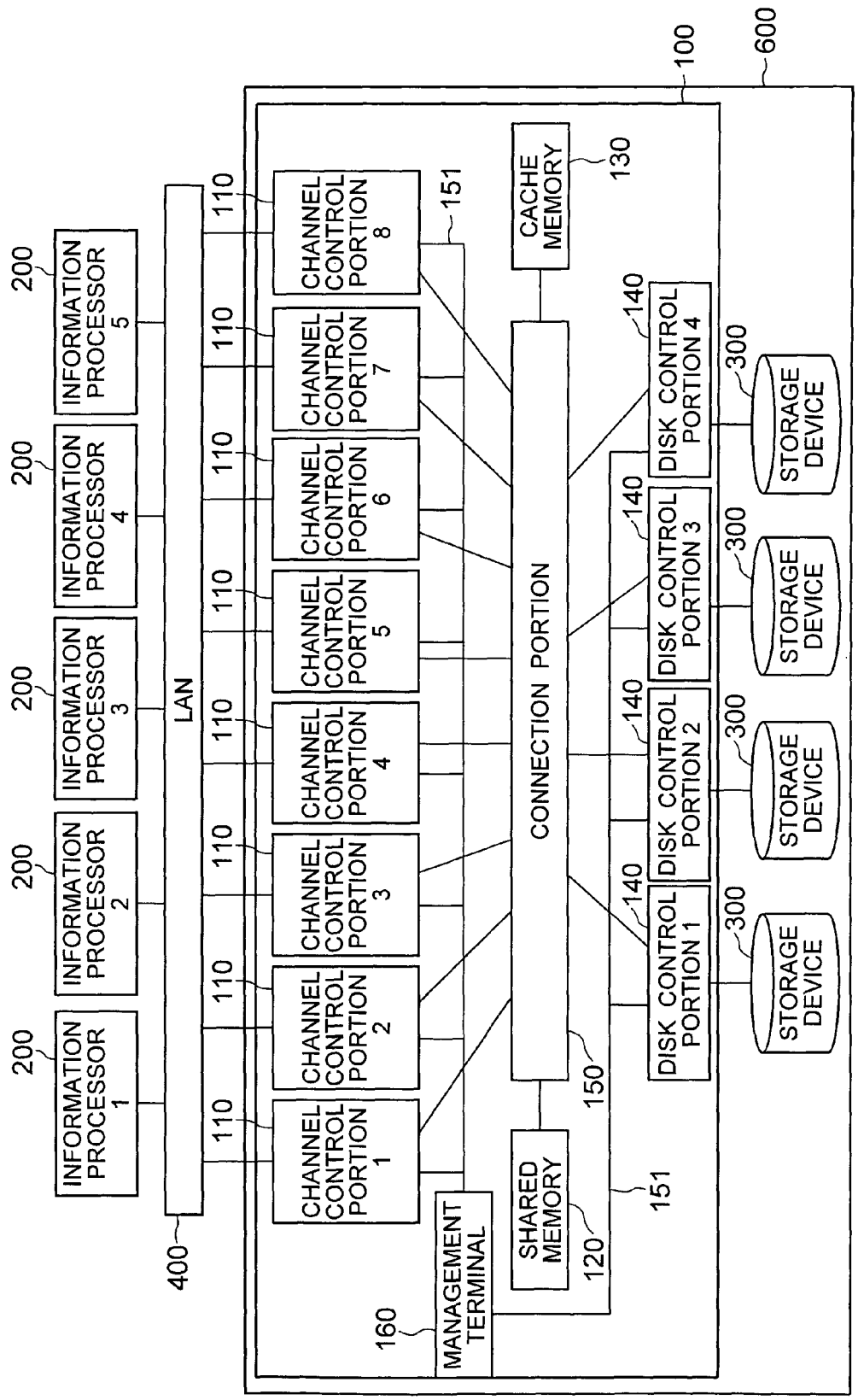
FIG. 1 is a block diagram showing the overall configuration of a storage system according to an embodiment of the invention.

FIG. 1 is a block diagram showing the overall configuration of a storage system 600 according to an embodiment of the invention.

(Example of Overall Configuration)

The storage system 600 includes a storage device controller 100, and storage devices 300. The storage device controller 100 controls the storage devices 300 according to commands received from information processors 200. For example, upon reception of a data input/output request from a certain information processor 200, the storage device controller 100 performs processing for input/output of data stored in the storage devices 300. Data are stored in logical volumes (logical units) (hereinafter referred to as LUs) which are storage regions logically set on physical storage regions provided by disk drives contained in the storage devices 300. The storage device controller 100 exchanges various kinds of commands with the information processors 200 for managing the storage system 600.

Each of the information processors 200 is a computer that contains a CPU. (Central Processing Unit), and a memory. The CPU contained in each information processor 200 executes various kinds of programs to implement various functions. For example, each information processor 200 may be a personal computer, a work station or a main frame computer.

In FIG. 1, the information processors 200 are connected to the storage device controller 100 through an LAN (Local Area Network) 400. The LAN 400 may be replaced by the Internet or by a private network. Communications between the information processors 200 and the storage device controller 100 through the LAN 400 are performed, for example, according to TCP/IP. The information processors 200 send requests for data access based on designated filenames (file-by-file data I/O requests, hereinafter referred to as file access requests) to the storage system 600.

The storage device controller 100 has channel control portions 110. The channel control portions 110 are hereinafter also referred to as CHNs. The storage device controller 100 uses the channel control portions 110 to communicate with the information processors 200 through the LAN 400. The channel control portions 110 individually accept file access requests from the information processors 200. That is, network addresses (e.g., IP addresses) on the LAN 400 are assigned to the channel control portions 110 respectively. Accordingly, the channel control portions 110 can serve as NASs respectively, so that the channel control portions 110 can provide NAS service to the information processors 200 as if the respective NASs were present as independent NASs. Because one storage system 600 is configured to include the channel control portions 110 for providing NAS service individually in the aforementioned manner, NAS servers that were heretofore operated by independent computers respectively can be collectively operated by a single storage system 600. This configuration permits the storage system 600 to perform general management, so that improvement in efficiency of maintenance transactions such as various kinds of setting/control, failure control and version control can be attained.

Incidentally, the function of each of the channel control portions 110 in the storage device controller 100 according to this embodiment is implemented by a hardware formed on a circuit board integrated as a unit, an operating system (hereinafter referred to as OS) executed by the hardware, and a software such as an application program operated on the OS, as will be described later. In this manner, in the storage system 600 according to this embodiment, the function which has been heretofore provided as part of hardware is mainly implemented by software. For this reason, in the storage system 600 according to this embodiment, flexible system operation can be conducted to make it possible to provide delicate service meeting diversified and varied users' needs.

(Storage Devices)

The storage devices 300 have a large number of disk drives (physical disks) to provide storage regions to the information processors 200. Data are stored in LUs which are storage regions logically set on physical storage regions provided by the disk drives. As the disk drives, various devices such as hard disk devices, flexible disk devices and semiconductor storage devices can be used.

Incidentally, for example, the storage devices 300 may be used in such a manner that a disk array is constituted by a plurality of disk drives. In this case, the storage regions provided to the information processors 200 may be provided by a plurality of disk drives managed by RAID.

The storage devices 300 may be connected to the storage device controller 100 directly as shown in FIG. 1 or through a network. The storage devices 300 may be also integrated with the storage device controller 100.

The LUs set in the storage devices 300 include user LUs allowed to be accessed by the information processors 200, and system LUs used for control of the channel control portions 110. Each system LU also stores an operating system executed by a corresponding CHN 110. The channel control portions 110 are associated with LUs respectively. Accordingly, LUs are assigned to the channel control portions 110 so that the LUs can be accessed by the channel control portions 110 respectively. The association may be also made so that one LU is used in common with a plurality of channel control portions 110. Incidentally, the user LUs and the system LUs are hereinafter also referred to as user disks and system disks. The LU used in common with a plurality of channel control portions 110 is hereinafter referred to as shared LU or shared disk.

(Storage Device Controller)

The storage device controller 100 includes channel control portions 110, a shared memory 120, a cache memory 130, disk control portions 140, a management terminal 160, and a connection portion 150.

Each channel control portion 110 has a communication interface for communicating with the information processors 200. That is, each channel control portion 110 has a function for exchanging data input/output commands with the information processors 200. For example, a CHN 110 accepts file access requests from the information processors 1 to 3 (200). The CHN 110 calculates storage addresses, data lengths, etc. of files and outputs I/O requests corresponding to the file access requests to thereby access the storage devices 300. In this manner, the storage system 600 can provide NAS service to the information processors 1 to 3 (200). Incidentally, each I/O request contains a data top address, a data length, and an access type such as read or write. In the case of data write, data to be written may be contained in the I/O request. The I/O request is output from an I/O processor 119 that will be described later.

The channel control portions 110 and the management terminal 160 are connected to one another through an internal LAN 151. Accordingly, micro-programs etc. to be executed by the channel control portions 110 can be sent and installed from the management terminal 160. The configuration of each cannel control portion 110 will be described later.

The connection portion 150 connects the channel control portions 110, the shared memory 120, the cache memory 130 and the disk control portions 140 to one another.

Exchange of data and commands among the channel control portions 110, the shared memory 120, the cache memory 130 and the disk control portions 140 is conducted through the connection portion 150. The connection portion 150 is a high-speed bus such as an ultra high-speed crossbar switch for performing data transmission by high-speed switching. Because the channel control portions 110 are connected to one another by the high-speed bus, performance of communications between the channel control portions 110 is improved greatly compared with a conventional configuration in which NAS servers operated on computers respectively are connected to one another through an LAN. In addition, the use of the high-speed bus makes a high-speed file sharing function, a high-speed fail-over function, etc. possible.

The shared memory 120 and the cache memory 130 are storage memories used in common with the channel control portions 110 and the disk control portions 140. The shared memory 120 is mainly used for storing control information, commands, etc. whereas the cache memory 130 is mainly used for storing data.

When, for example, the data input/output command received by a certain channel control portion 110 from a certain information processor 200 is a write command, the channel control portion 110 writes the write command in the shared memory 120 and further writes write data received from the information processor 200 in the cache memory 130. On the other hand, each disk control portion 140 monitors the shared memory 120. When a pertinent disk control portion 140 detects that the write command has been written in the shared memory 120, the disk control portion 140 reads the write data from the cache memory 130 and writes the write data in a pertinent storage device 300 in accordance with the command.

In addition, when the data input/output command received by a certain channel control portion 110 from a certain information processor 200 is a read command, the channel control portion 110 writes the read command in the shared memory 120 and checks whether data to be read is present in the cache memory 130 or not. When the data is present in the cache memory 130, the channel control portion 110 sends the data to the information processor 200. On the other hand, when the data to be read is not present in the cache memory 130, the disk control portion 140 monitoring the shared memory 120 so as to detect the writing of the read command in the shared memory 120 reads data as a subject of reading from a pertinent storage device 300, writes the data in the cache memory 130 and writes notification of the writing in the shared memory 120. When the channel control portion 110 monitors the shared memory 120 so as to detect the notification of the writing of the data as a subject of reading in the cache memory 130, the channel control portion 110 sends the data to the information processor 200.

Incidentally, as an alternative to the configuration in which instructions given from the channel control portions 110 to the disk control portions 140 to write or read data are conducted indirectly with intermediation of the shared memory 120 in this manner, there may be, for example, adopted another configuration in which instructions given from the channel control portions 110 to the disk control portions 140 to write or read data are conducted directly without intermediation of the shared memory 120.

The disk control portions 140 control the storage devices 300 respectively. For example, the channel control portions 110 write data in the storage devices 300 according to the data write commands received from the information processors 200 in the aforementioned manner. When a request of data access to an LU based on a designated logical address is sent from a certain channel control portion 110 to a corresponding disk control portion 140, the disk control portion 140 converts the data access request into a request of data access to a physical disk based on a designated physical address. In the case where the physical disks in the storage devices 300 are managed by RAID, data access is made according to the RAID configuration (e.g., RAID0, RAID1 or RAID5). The disk control portions 140 perform duplicating management control and backup control of data stored in the storage devices 300. In addition, the disk control portions 140 perform control (a replication function or a remote copying function) to store a replica of data of the storage system 600 on a primary site in the other storage system installed on a secondary site for the purpose of prevention of data destruction caused by occurrence of a disaster (disaster recovery), etc.

The disk control portions 140 and the management terminal 160 are connected to one another through the internal LAN 151 so as to be able to communicate with one other. Accordingly, micro-programs etc., to be executed by the disk control portions 140 can be sent and installed from the management terminal 160. The configuration of each disk control portion 140 will be described later.

Although this embodiment has been described on the case where the shared memory 120 and the cache memory 130 are provided independent of the channel control portions 110 and the disk control portions 140, this embodiment is not limited to this case. It may be also preferable that the shared memory 120 or the cache memory 130 are distributively provided in each of the channel control portions 110 and the disk control portions 140. In this case, the channel control portions 110 and the disk control portions 140 provided with distributed shared memories or cache memories are connected to one another by the connection portion 150.

(Management Terminal)

The management terminal 160 is a computer for maintaining and managing the storage system 600. When the management terminal 160 is operated, for example, setting of physical disk configuration in the storage devices 300, setting of LUs, installation of micro-programs to be executed by the channel control portions 110, etc. can be conducted. As the setting of physical disk configuration in the storage devices 300, for example, increase or decrease in the number of physical disks, change in RAID configuration (e.g., change from RAID1 to RAID5), etc. may be made. Further, operations such as checking the operating state of the storage system 600, specifying a failure portion, installing an operating system to be executed by each channel control portion 110, etc. may be also made by the management terminal 160. The management terminal 160 may be also connected to an external maintenance center through an LAN, a telephone line or the like so that failure in the storage system 600 can be monitored by use of the management terminal 160 and that measures against failure can be taken speedily when failure occurs. Notice of occurrence of failure is given, for example, from an OS, an application program, a driver software, etc. This notice is made by an HTTP (HyperText Transport Protocol), an SNMP (Smile Network Management Protocol), an e-mail, etc. The setting and control may be made by an operator or the like while a Web page provided by a Web server operated by the management terminal 160 is used as a user interface. The operator or the like may perform setting of a subject or content of failure monitoring, setting of a failure notice destination, etc. by operating the management terminal 160.

The management terminal 160 may be built in the storage device controller 100 or may be externally attached to the storage device controller 100. The management terminal 160 may be provided as a computer exclusively used for maintenance and management of the storage device controller 100 and the storage devices 300 or may be provided as a general-purpose computer formed to have a maintenance and management function.

Figures 2, 3, 4:
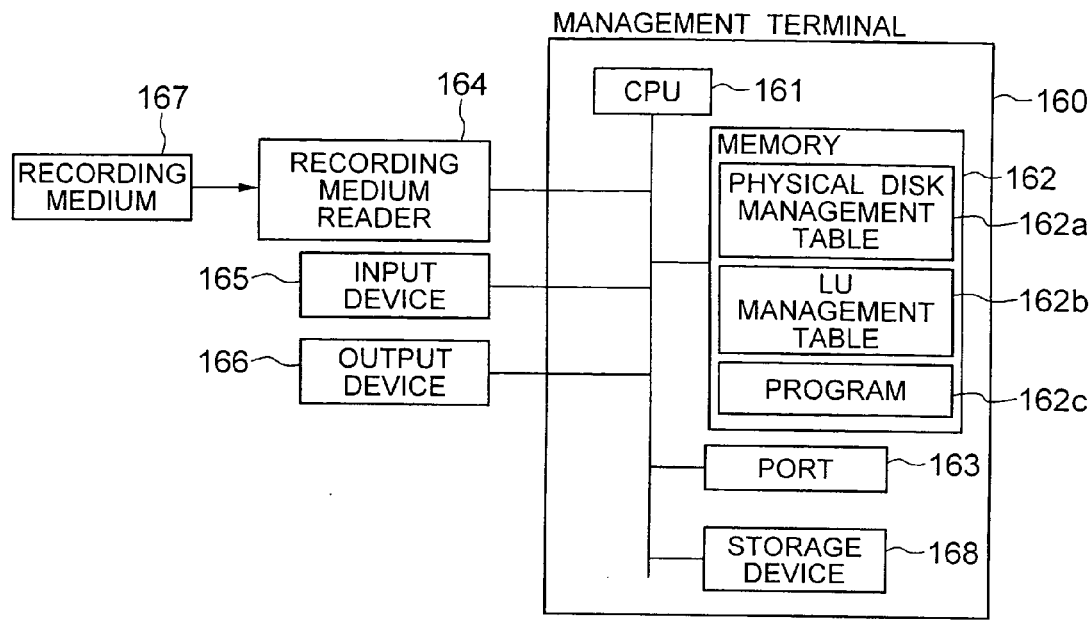
FIG. 2 is a block diagram showing the configuration of a management terminal in this embodiment.
FIG. 3 is a view showing a physical disk management table in this embodiment.
FIG. 4 is a view showing an LU management table in this embodiment.

FIG. 2 is a block diagram showing the configuration of the management terminal 160.

The management terminal 160 includes a CPU 161, a memory 162, a port 163, a recording medium reader 164, an input device 165, an output device 166, and a storage device 168.

The CPU 161 has charge of general control of the management terminal 160. When the CPU 161 executes a program 162c stored in the memory 162, the function of a Web server as described above, or the like, can be implemented. The memory 162 stores a physical disk management table 162a and an LU management table 162b as well as the program 162c.

The physical disk management table 162a is a table for managing the physical disks (disk drives) contained in the storage devices 300. FIG. 3 shows the physical disk management table 162a. Of a large number of physical disks contained in the storage devices 300, disk numbers #001 to #006 are shown in FIG. 3. The capacity, RAID configuration and status of use are shown for each physical disk.

The LU management table 162b is a table for managing the LUs logically set on the physical disks. FIG. 4 shows the LU management table 162b. Of a large number of LUs set on the storage devices 300, LU numbers #1 to #3 are shown in FIG. 4. The physical disk number, capacity and RAID configuration are shown for each LU.

The recording medium reader 164 is a device for reading programs and data recorded in a recording medium 167. The programs and data read thus are stored in the memory 162 or the storage device 168. Accordingly, for example, a program 162c recorded in the recording medium 167 can be read from the recording medium 167 by the recording medium reader 164 and stored in the memory 162 or the storage device 168. A flexible disk, a CD-ROM, a DVD-ROM, a DVD-RAM, a semiconductor memory, or the like, may be used as the recording medium 167. Incidentally, the program 162c can be used as a program for operating the management terminal 160 and can be used also as a program for installing an OS 701 or an application program in each channel control portion 110 or each disk control portion 140 or as a program for upgrading the version of the OS 701 or the application program. The recording medium reader 164 may be built in the management terminal 160 or may be externally attached to the management terminal 160. The storage device 168 is, for example, a hard disk device, a flexible disk device, a semiconductor storage device, etc. The input device 165 is used for inputting data into the management terminal 160 by an operator or the like. For example, a key board, a mouse, or the like is used as the input device 165. The output device 166 is a device for outputting information to the outside. For example, a display, a printer, or the like, is used as the output device 166. The port 163 is connected to the internal LAN 151, so that the management terminal 160 can communicate with the channel control portions 110, the disk control portions 140, etc. through the port 163. The port 163 may be also connected to the LAN 400 or to the telephone line.

(External Appearance View)

Figure 5:
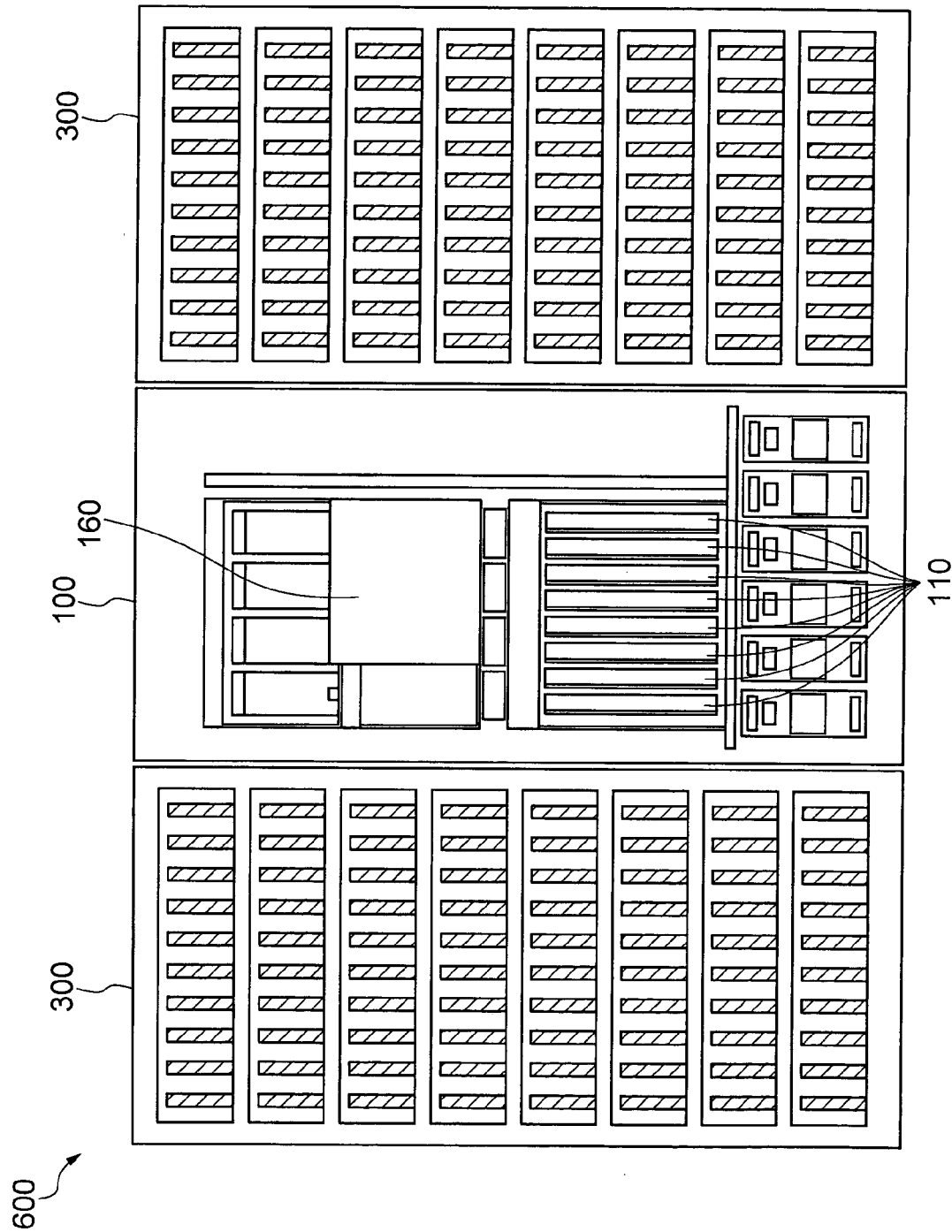
FIG. 5 is a view showing the external appearance configuration of the storage system in this embodiment.
Figure 6:
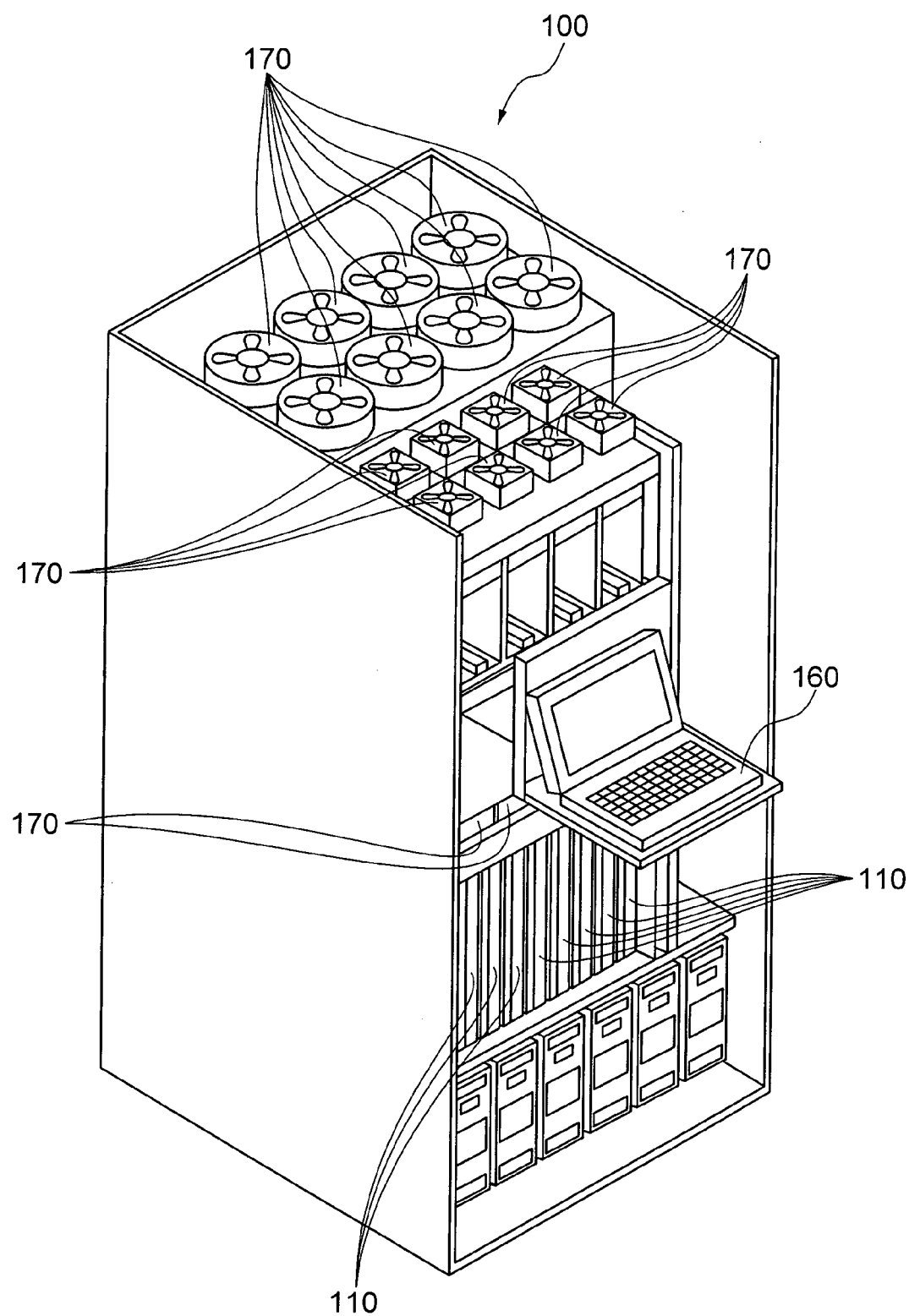
FIG. 6 is a view showing the external appearance configuration of a storage device controller in this embodiment.

FIG. 5 shows the external appearance configuration of the storage system 600 according to this embodiment. FIG. 6 shows the external appearance configuration of the storage device controller 100.

As shown in FIG. 5, the storage system 600 according to this embodiment is formed so that the storage device controller 100 and the storage devices 300 are stored in respective casings. The casings of the storage devices 300 are disposed on opposite sides of the casing of the storage device controller 100.

The storage device controller 100 has the management terminal 160 in its front center portion. The management terminal 160 is closed with a cover. When the cover is opened as shown in FIG. 6, the management terminal 160 can be used. Although the management terminal 160 shown in FIG. 6 is shaped like a so-called notebook type personal computer, any shape may be used.

Slots for attaching boards of the channel control portions 110 are provided below the management terminal 160. The boards of the channel control portions 110 are units in which circuit boards of the channel control portions 110 are formed respectively and which are attached to the slots respectively. In the storage system 600 according to this embodiment, eight slots are prepared. FIGS. 5 and 6 show a state in which the boards of the channel control portions 110 are attached into the eight slots respectively. A guide rail is provided in each slot so that the board of the channel control portion 110 can be attached into the slot through the guide rail. When the boards of the channel control portions 110 are inserted into the slots along the guide rails respectively, the boards of the channel control portions 110 can be mounted on the storage device controller 100. When the board of the channel control portion 110 which has been attached into each slot is drawn out forward along the guide rail, the board of the channel control portion 110 can be removed. A connector is provided in a front portion on a deep side of each slot so that the board of each channel control portion 110 can be electrically connected to the storage device controller 100 by the connector.

Channel control portions 110 of the type having a function for connection to an SAN (Storage Area Network) and channel control portions 110 of the type having a function for performing communications in accordance with a main frame type protocol such as FICON (Fibre Connection) (registered trademark), ESCON (Enterprise System Connection) (registered trademark), or the like, as well as channel control portions 110 of the type functioning as an NAS described above, may be attached into the slots. Further, some slots may be provided as empty slots in a state that the boards of the channel control portions 110 have not been attached into the slots yet.

Figure 11:
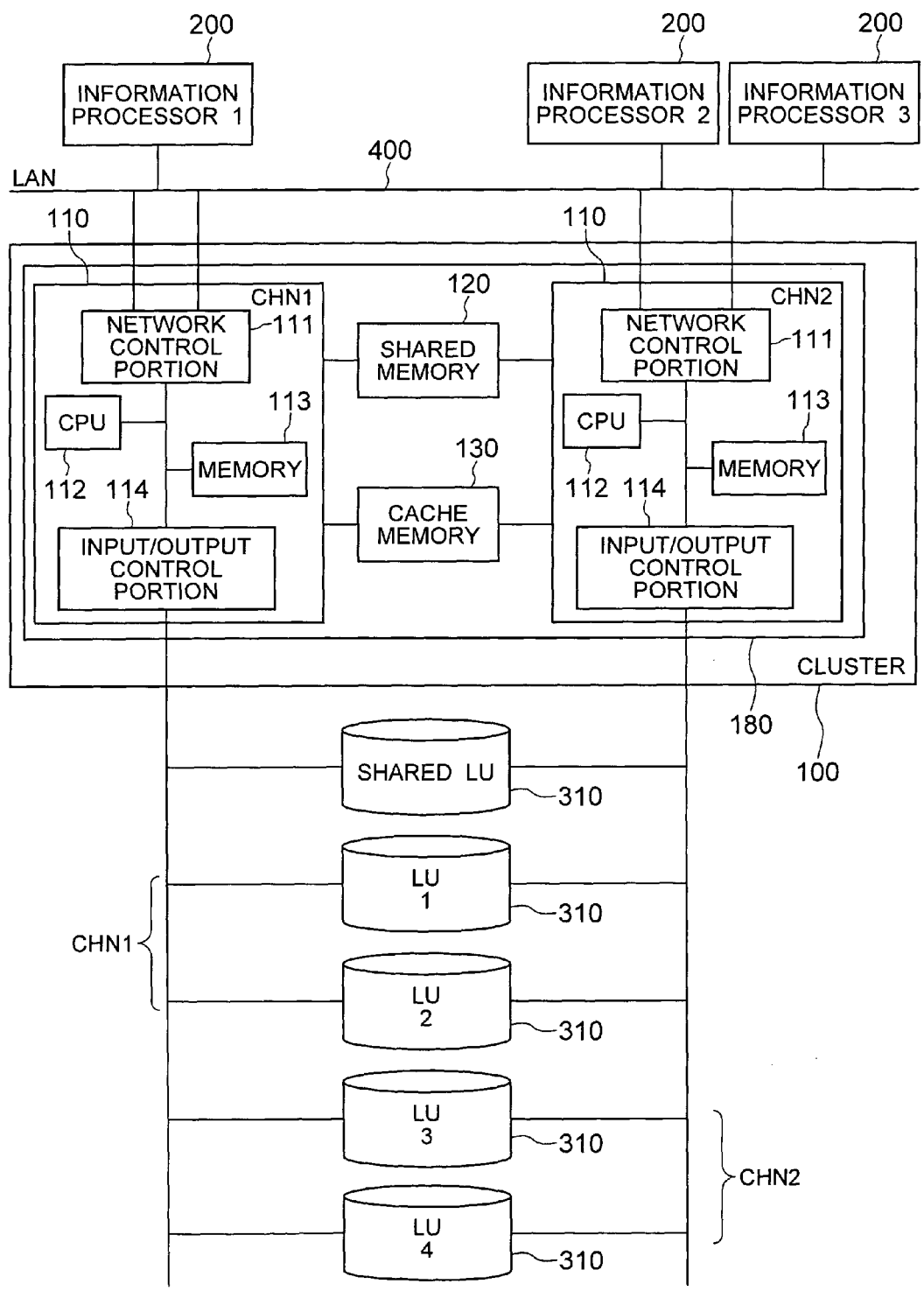
FIG. 11 is a diagram showing a state in which a cluster is constituted by channel control portions in this embodiment.

In the channel control portions 110 attached into the slots, each cluster is constituted by the same kind of channel control portions 110. For example, a pair of CHNs 110 may form a cluster. When clusters are formed, even in the case where failure occurs in a certain channel control portion 110 in a certain cluster, processing that has been executed by the failed channel control portion 110 until then can be handed over to the other channel control portion 110 in the cluster (fail-over control). FIG. 11 is a view showing a state in which a pair of CHNs 110 form a cluster. The cluster will be described later in detail.

Incidentally, in the storage device controller 100, two power supply systems are provided for improvement in reliability. The eight slots into which the boards of the channel control portions 110 are attached are divided into four and four by the two power supply systems. Therefore, when clusters are formed, each of the clusters contains boards of the channel control portions 110 belonging to the two power supply systems respectively. As a result, even in the case where failure occurs in one power supply system so that power supply stops, power supply to the board of the channel control portion 110 belonging to the other power supply system in the same cluster is continued so that processing can be handed over to the channel control portion 110 (fail-over).

Incidentally, as described above, each channel control portion 110 is provided as a board that can be attached into each slot. One board may be composed of a plurality of circuit boards integrated into one body.

Though not shown in FIGS. 5 and 6, other devices such as the disk control portions 140, the shared memory 120, etc. for forming the storage device controller 100 are attached to the back, or the like, of the storage device controller 100.

Fans 170 for radiating heat generated in the boards of the channel control portions 110, etc. are provided in the storage device controller 100. The fans 170 are provided on a top portion of the storage device controller 100 and on an upper portion of the slots for the channel control portions 110.

Incidentally, for example, conventional devices commercialized to support the SAN can be used as the storage device controller 100 and the storage devices 300 configured to be packed in casings. Particularly when the shape of the connector provided in the board of each CHN 110 is formed so as to be able to be directly attached into a slot provided in a conventional casing as described above, conventional devices can be used more easily. That is, the storage system 600 according to this embodiment can be constructed easily when existing products are used.

(Channel Control Portion)

In the storage system 600 according to this embodiment, as described above, each CHN 110 accepts a file access request from a certain information processor 200 and provides NAS service to the information processor 200.

Figure 7:
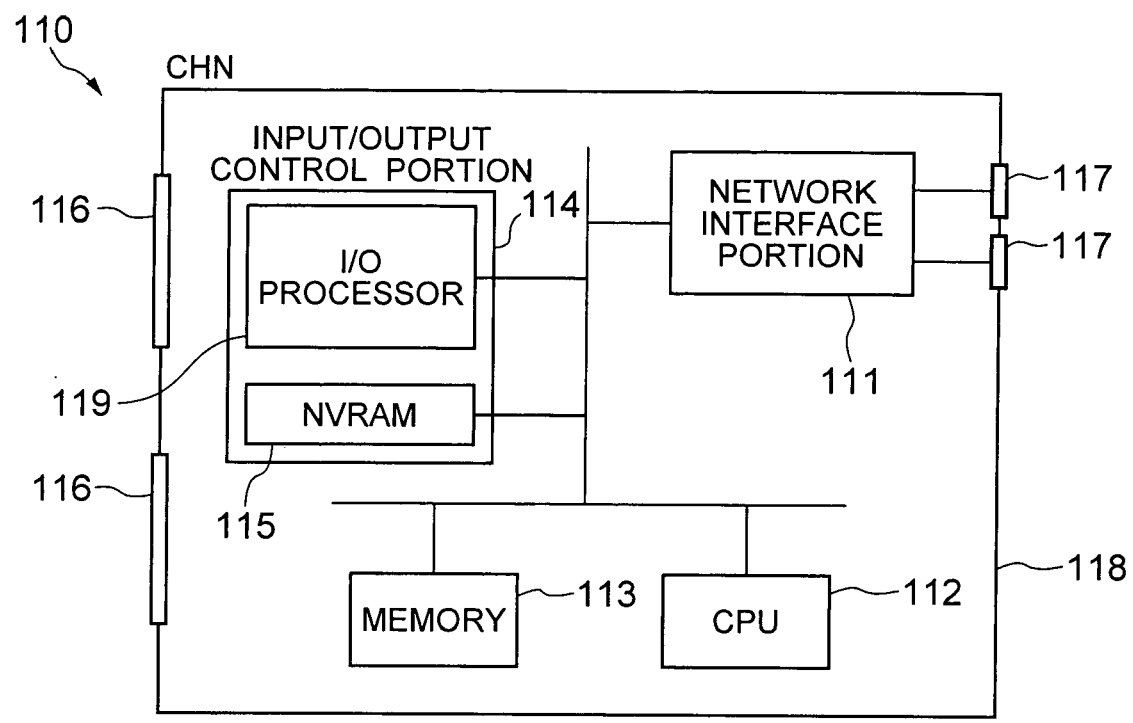
FIG. 7 is a diagram showing a channel control portion in this embodiment.

FIG. 7 shows the hardware configuration of a CHN 110. As shown in FIG. 7, the hardware of the CHN 110 is constituted by a board integrated as a unit. This unit is hereinafter also referred to as NAS board. The NAS board may be composed of a circuit board or of a plurality of circuit boards. More specifically, the NAS board includes a network interface portion 111, a CPU 112, a memory 113, an input/output control portion 114 (having an I/O (Input/Output) processor 119, and an NVRAM (Non-Volatile RAM) 115), board connection connectors 116, and communication connectors 117. The NAS board is formed and configured as a circuit board having these parts integrated 200. Through the network interface portion 111, the CHN 110 receives a file access request sent from a certain information processor 200, for example, according to TCP/IP. The communication connectors 117 are connectors used for communicating with the information processors 200. In the case of the CHN 110, the communication connectors 117 are connectors that can be connected to the LAN 400, for example, to support Ethernet (registered trademark).

The CPU 112 has charge of control for making the CHN 110 function as an NAS board.

Figure 8:
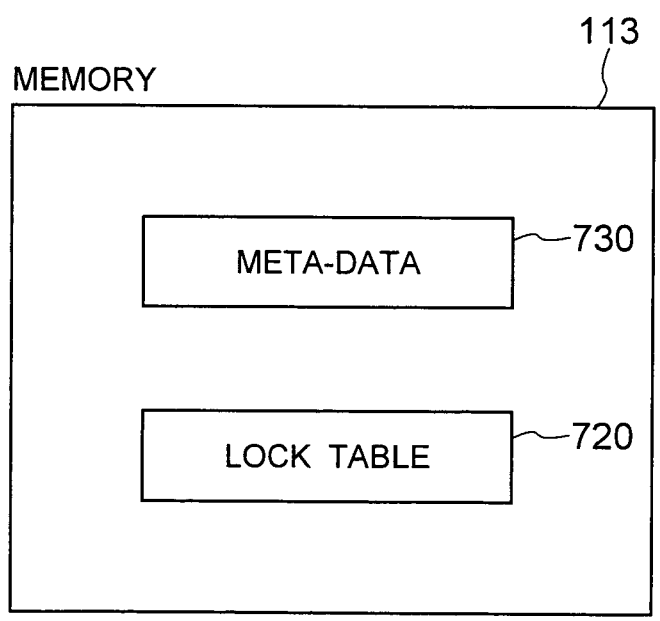
FIG. 8 is a diagram for explaining the content of data stored in a memory in this embodiment.
Figure 10:
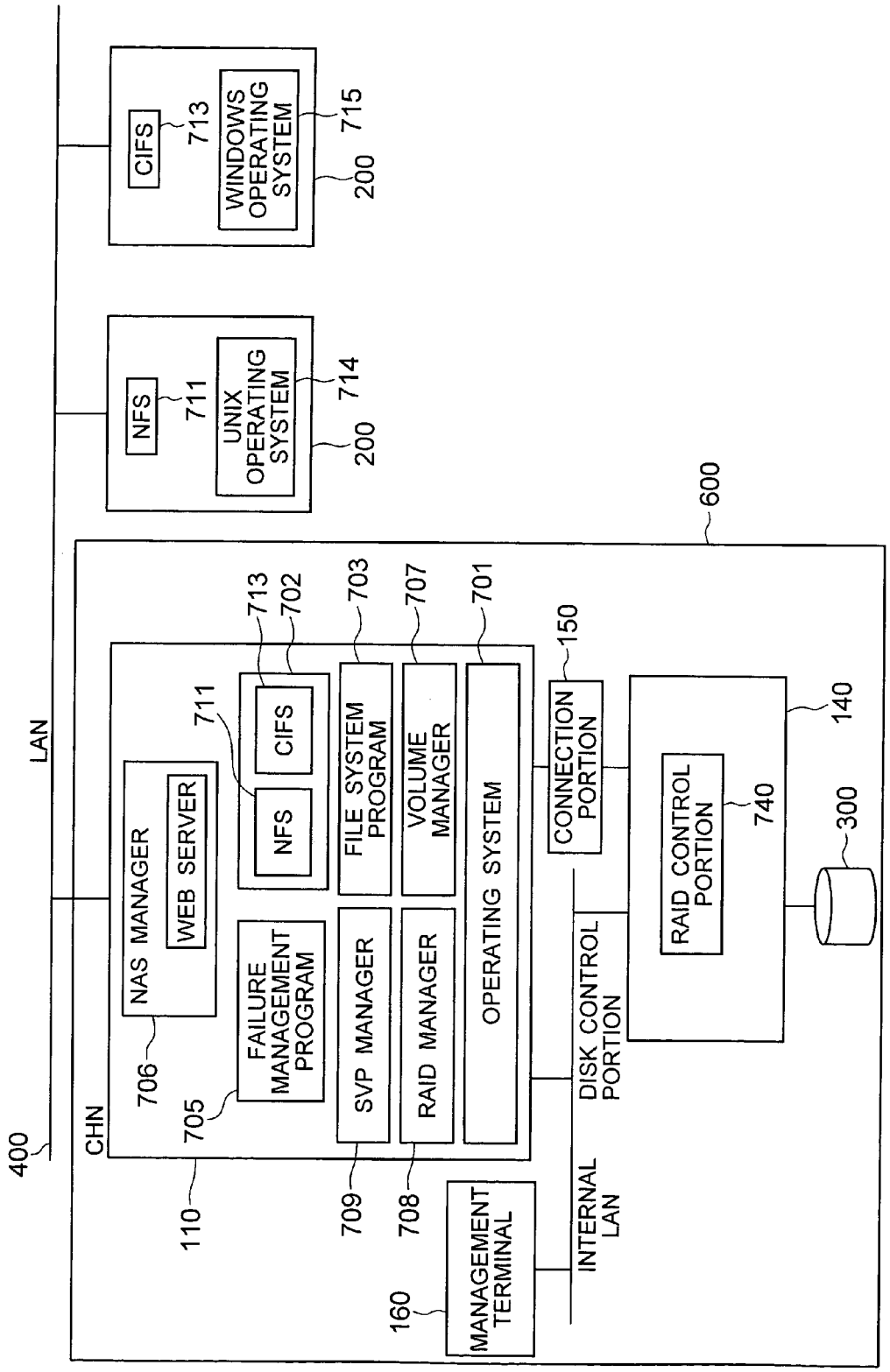
FIG. 10 is a software configuration diagram in this embodiment.

Various programs and data are stored in the memory 113. For example, meta-data 730 and a lock table 720 shown in FIG. 8 or various kinds of programs such as an NAS manager 706 etc. shown in FIG. 10 are stored in the memory 113.

The meta-data 730 is information generated in correspondence with files managed by a file system implemented by a file system program 703. The meta-data 730 contains information for specifying file archiving places, such as addresses on LUs in which data of files are stored, data sizes, etc. The meta-data 730 may further contain information concerning file capacity, owner, update time, etc. The meta-data 730 may be generated in correspondence with directories instead of files. FIG. 12 shows an example of the meta-data 730. The meta-data 730 is also stored in each of LUs on the storage devices 300.

The lock table 720 is a table for exclusively controlling file access executed by the information processors 200. Exclusive control permits files to be used in common with the information processors 200. FIG. 13 shows the lock table 720. As shown in FIG. 13, the lock table 720 is divided into a file lock table 721 and an LU lock table 722. The file lock table 721 is a table for indicating whether each file is locked or not. While a certain file is opened by one of the information processors 200, the file is locked. The locked file is disabled from being accessed by the other information processors 200. The LU lock table 722 is a table for indicating whether each LU is locked or not. While a certain LU is accessed by one of the information processors 200, the LU is locked. The locked LU is disabled from being accessed by the other information processors 200.

The input/output control portion 114 exchanges data and commands with the disk control portions 140, the cache memory 130, the shared memory 120 and the management terminal 160. The input/output control portion 114 has an I/O processor 119, and an NVRAM 115. For example, the I/O processor 119 is constituted by a one-chip microcomputer. The I/O processor 119 controls the exchange of data and commands and relays communications between the CPU 112 and the disk control portions 140. The NVRAM 115 is a non-volatile memory that stores programs taking charge of control of the I/O processor 119. The contents of the programs stored in the NVRAM 115 can be written or rewritten in accordance with instructions given from the management terminal 160 or the NAS manager 706 that will be described later.

Figure 9:
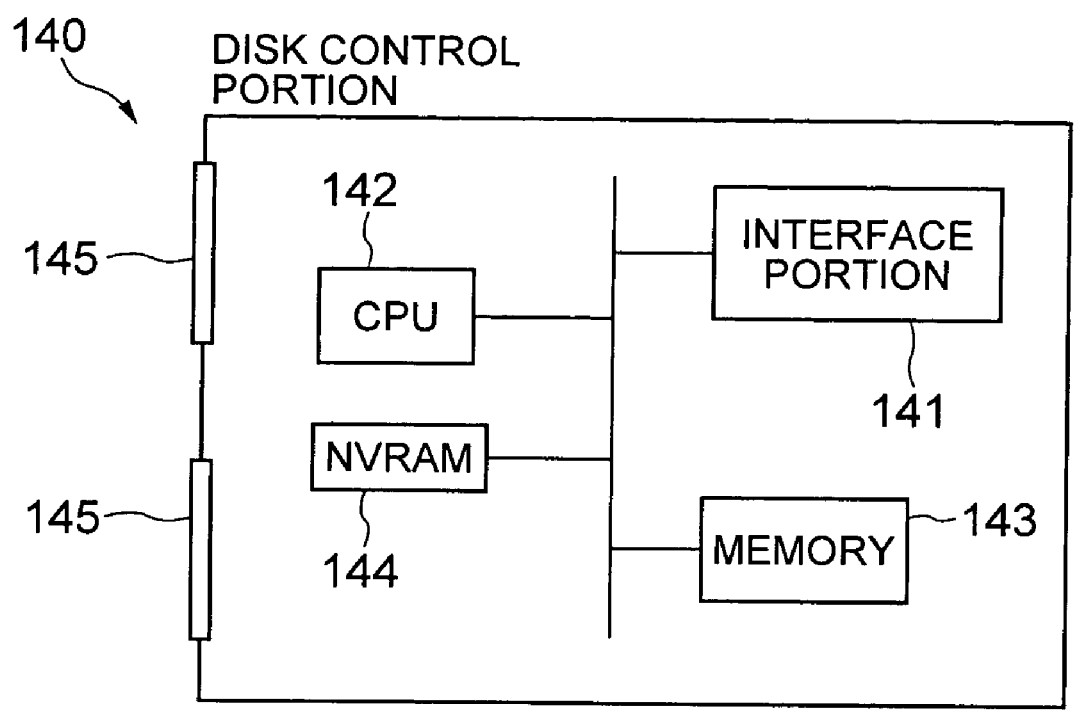
FIG. 9 is a diagram showing a data control portion in this embodiment.

FIG. 9 is a diagram showing the hardware configuration of each disk control portion 140.

Each disk control portion 140 is formed as a board integrated as a unit. The board of the disk control portion 140 includes an interface portion 141, a memory 143, a CPU 142, an NVRAM 144, and board connection connectors 145. The board is formed as a circuit board having these parts integrated into one unit.

The interface portion 141 has a communication interface for communicating with the channel control portions 110, etc. through the connection portion 150, and a communication interface for communicating with the storage devices 300.

The CPU 142 has charge of general control of the disk control portion 140 and communicates with the channel control portions 110, the storage devices 300 and the management terminal 160. When various kinds of programs stored in the memory 143 or the NVRAM 144 are executed, the function of the disk control portion 140 according to this embodiment can be implemented. Examples of the function implemented by the disk control portion 140 are control of the storage devices 300, RAID control, duplication management and backup control of data stored in the storage devices 300, remote copy control, and so on.

The NVRAM 144 is a non-volatile memory for storing programs taking charge of control of the CPU 142. The contents of the programs stored in the NVRAM 144 can be written or rewritten in accordance with instructions given from the management terminal 160 or the NAS manager 706.

The board of the disk control portion 140 has board connection connectors 145. When a board connection connector 145 is fitted to a storage device controller 100 side connector, the board of the disk control portion 140 is electrically connected to the storage device controller 100.

(Software Configuration)

FIG. 10 is a diagram showing the software configuration of the storage system 600 according to this embodiment.

For example, the operating system 701 is UNIX (registered trademark). On the operating system 701, softwares such as an RAID manager 708, a volume manager 707, an SVP manager 709, a file system program 703, a network control portion 702, a failure management program 705, an NAS manager 706, etc. operate.

The RAID manager 708 operating on the operating system 701 provides a function for setting parameters for a RAID control portion 740 and controlling the RAID control portion 740. The RAID manager 708 accepts parameters and control instruction information from the operating system 701, another application operating on the operating system 701 or the management terminal 160, and performs setting of the accepted parameters for the RAID control portion 740 and transmission of control commands corresponding to the control instruction information to the RAID control portion 740.

Examples of the parameters set here are parameters for definitions (such as designation of configuration information of an RAID group, stripe size, etc.) of storage devices (physical disks) constituting an RAID group, parameters for setting an RAID level (such as RAID0, RAID1 or RAID5), and so on. Examples of the control commands sent from the RAID manager 708 to the RAID control portion 740 are commands for instructing configuration of RAID, deletion and capacity change, commands for requesting configuration information of each RAID group, and so on.

The volume manager 707 further virtualizes LUs provided by the RAID control portion 740 and provides the virtualized LUs as virtual logical volumes to the file system program 703. One virtual logical volume includes one or more logical volumes.

The main function of the file system program 703 is to manage association of filenames designated by file access requests received by the network control portion 702, with addresses on virtual logical volumes storing the filenames. For example, the file system program 703 designates addresses, on virtual logical volumes, corresponding to filenames designated by file access requests respectively.

The network control portion 702 is configured to include two file system protocols of NFS (Network File System) 711 and CIFS (Common Interface File System) 713. The NFS 711 accepts file access requests from UNIX (registered trademark) information processors 200 in which the NFS 711 operates. On the other hand, the CIFS 713 accepts file access requests from Windows (registered trademark) information processors 200 in which the CIFS 713 operates.

The NAS manager 706 is a program for performing checking the operating state of the storage system 600, setting the storage system 600, controlling the storage system 600, and so on. The NAS manager 706 further has the function of a Web server and provides a setting Web page to a pertinent information processor 200 so that the storage system 600 can be set and controlled on the information processor 200 side. The setting Web page is provided by the NAS manager 706 that operates in each of the channel control portions 110. In response to an HTTP (HyerText Transport Protocol) request from a certain information processor 200, the NAS manager 706 sends data for the setting Web page to the information processor 200. A system administrator or the like instructs setting and controlling of the storage system 600 by using the setting Web page displayed on the information processor 200.

Upon reception of data concerning setting and controlling sent from the information processor 200 in accordance with the operation on the setting Web page, the NAS manager 706 executes the setting and controlling corresponding to the data. In this manner, various setting and controlling of the storage system 600 can be performed on the information processor 200 side. The NAS manager 706 notifies the OS and the application program operating on the channel control portion 110, the disk control portion 140, etc., of the contents set on the setting Web page. The contents set on the setting Web page may be managed in a shared LU 310.

Examples of the contents set on the setting Web page provided by the NAS manager 706 are management and setting of LUs (management of capacity, extension or reduction of capacity, user allocation, etc.), setting and controlling concerning the aforementioned function such as duplication management and remote copy (replication) (setting of duplication source LU and duplication destination LU, etc.), cluster management of redundantly configured CHNs (setting of correspondence relation of CHNs to be failed over, fail-over method, etc.), version management of the OS and application programs operating on the OS, and so on.

Incidentally, for checking of the operating state of the storage system 600 and setting and controlling of the storage system 600 by the NAS manager 706, a client server system may be used instead of the method using the aforementioned setting Web page. In this case, the NAS manager 706 has a server function of a client server system. Setting and controlling sent in accordance with the operation of a client function of the information processor 200 are carried out in the same manner as in the aforementioned setting Web page to thereby perform checking of the operating state of the storage system 600 and setting and controlling of the storage system 600.

The SVP manager 709 provides various kinds of service to the management terminal 160 in accordance with requests from the management terminal 160. For example, the SVP manager 709 provides various kinds of set contents concerning the storage system 600, such as set contents of LUs and set contents of RAID, to the management terminal 160 and reflects various kinds of setting concerning the storage system 600 given from the management terminal 160.

(Inter-Cluster Synchronous Control)

The failure management program 705 is a program for performing fail-over control between channel control portions 110 that form a cluster.

FIG. 11 is a diagram showing a state in which two CHNs 110 form a cluster 180. In FIG. 11, there is shown the case where CHN1 (channel control portion 1) 110 and CHN2 (channel control portion 2) 110 form a cluster (group) 180.

As described above, a fail-over process is carried out between the channel control portions 110 that form the cluster 180. When, for example, some failure occurs in CHN1 (110) so that processing cannot be continued, processing that has been executed by CHN1 (110) until then is handed over to CHN2 (110) so that the processing will be executed by CHN2 (110) succeedingly.

Incidentally, when failure occurs in a CHN 110, fail-over may be carried out automatically or may be carried out manually by operator's operating the management terminal 160. Or fail-over may be carried out manually on a pertinent information processor 200 side by user's using the setting Web page provided by the NAS manager 706. For example, fail-over is carried out manually in the case where the hardware (e.g., NAS board) of a channel control portion 110 needs to be exchanged for a new one because of expiration of the durable period, upgrade of the version, periodic diagnosis, etc.

To make it possible for CHN2 (110) to execute processing succeedingly as a substitute for CHN1 (110), various data must be handed over from CHN1 (110) to CHN2 (110). Examples of the data handed over from CHN1 (110) to CHN2 (110) are NFS user data, CISF user data, system administrator data, fail-over heart beat, IP address of CHN1 (110), NFS file lock information, cluster control information, etc.

NFS user data are data for managing the user allowed to receive file access service from CHN1 (110) by using an information processor 200 in which the UNIX (registered trademark) operating system is operated. For example, log-in ID, password, etc. of the user are data registered as the NFS user data. When NFS user data of CHN1 (110) are handed over to CHN2 (110), CHN2 (110) can succeedingly provide file access service to the user that has received file access service from CHN1 (110) until then.

CIFS user data are data for managing the user allowed to receive file access service from CHN1 (110) by using an information processor 200 in which the Windows (registered trademark) operating system is operated. For example, log-in ID, password, etc. of the user are data registered as the CIFS user data. When CIFS user data of CHN1 (110) are handed over to CHN2 (110), CHN2 (110) can succeedingly provide file access service to the user that has received file access service from CHN1 (110) until then.

System administrator data are data for managing the administrator of the storage system 600 or storage device controller 100. For example, system administrator data contain log-in ID and password of the administrator, and data indicating the position of the home directory. The system administrator data are data used in common with all the channel control portions 110 in the storage device controller 100 regardless of the cluster 180.

Fail-over heart beat is data by which respective CHNs 110 in a cluster 180 check their operating states mutually. Each of CHN1 (110) and CHN2 (110) periodically gives the other the notice of data (heart beat marks) indicating the fact that its own processing is carried out normally. Each of CHN1 (110) and CHN2 (110) checks whether the notice comes from the other or not. When each cannot confirm the notice from the other, each makes a decision that some failure occurs in the other. The heart beat marks contain information such as identifier of CHN 110, code indicating whether CHN 110 is normal or abnormal, update time, and so on.

IP address of CHN 110 is an address for specifying the CHN 110 when communications are made on the LAN 400 according to the communication protocol TCP/IP. When, for example, CHN2 (110) takes over the IP address of CHN1 (110), CHN2 (110) can receive data that have been received by CHN1 (110) through the LAN 400 until then.

NFS file lock information is data for managing lock states of files and includes a file lock table 721 and an LU lock table 722.

Cluster control information contains other data required for the handover between CHNs 110 in a cluster. Examples of the cluster control information are mount information concerning mounting of a file system constructed in the LU managed by the failed CHN 110, the MAC (Media Access Control) address of the network interface portion 111, and export information of a network file system.

When these inherited data are handed over from CHN1 (110) to CHN2 (110), CHN2 (110) also takes over processing that has been executed by CHN1 (110) until then.

In the storage device controller 100 according to this embodiment, the handover is carried out by synchronizing these inherited data between the predecessor CHN 110 and the successor CHN 110. That is, controlling is made so that the contents of the inherited data in the predecessor CHN 110 are identical to those in the successor CHN 110.

When, for example, any inherited data is updated by a certain CHN 110, the updated inherited data is sent to the other CHN 110 through a network by which the CHNs 110 are connected to each other. In this manner, the contents of inherited data referred to by the predecessor CHN 110 and the successor CHN 110 can be made identical to each other. As the network for connecting the CHNs 110 to each other, the LAN 400 may be used, the connection portion 150 may be used, or the internal LAN 151 may be used.

The inherited data may be stored in the shared LU (shared volume) allowed to be accessed commonly by a plurality of CHNs 110 so that synchronization of the inherited data can be achieved. As a result, the identical inherited data can be referred to by the predecessor CHN 110 and the successor CHN 110.

The inherited data may be stored in the shared memory 120 allowed to be accessed commonly by a plurality of CHNs 110 so that the identical inherited data can be referred to by the predecessor CHN 110 and the successor CHN 110.

Figure 14:
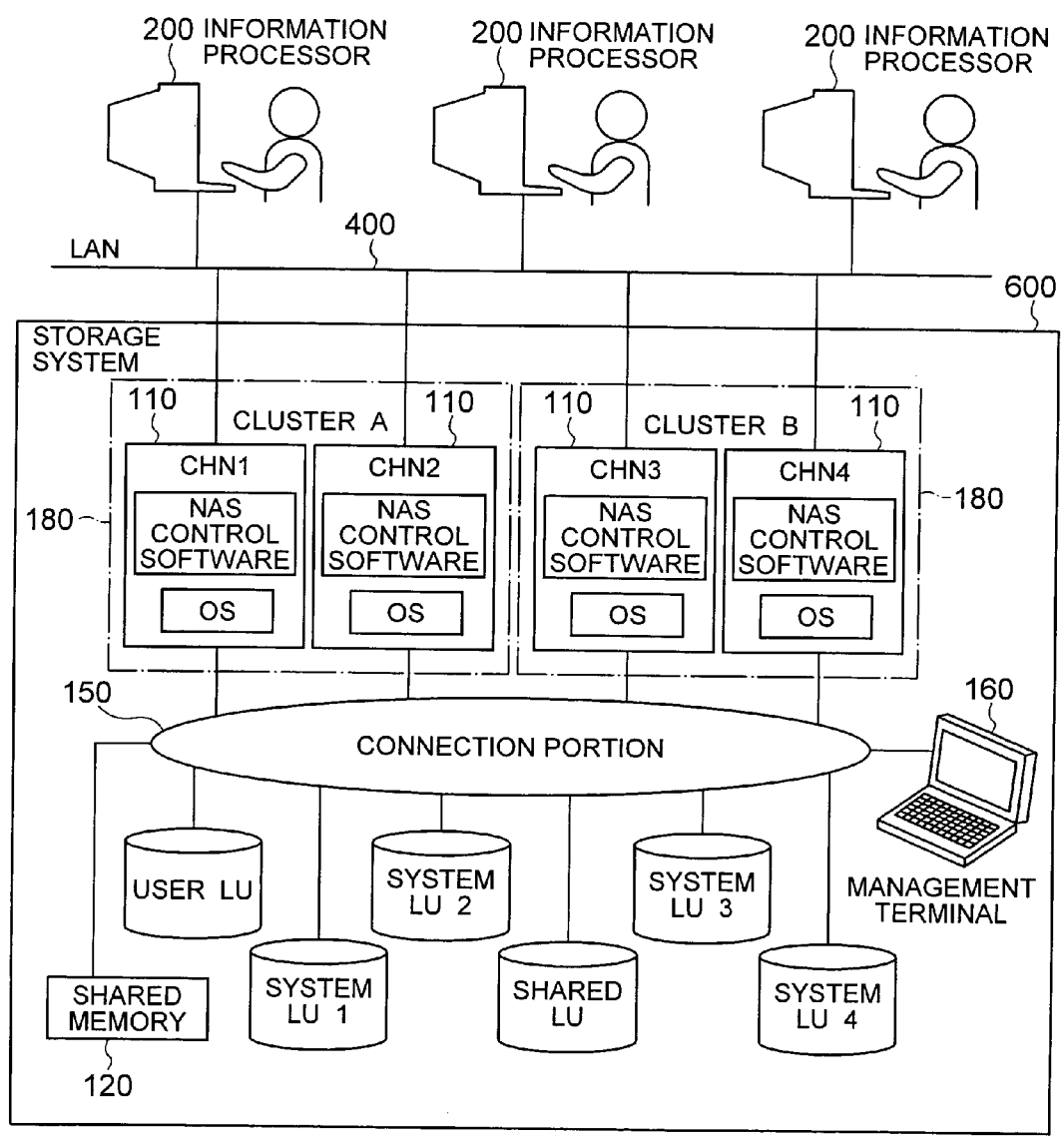
FIG. 14 is a diagram showing system LUs, a user LU and a shared LU in the storage system in this embodiment.

FIGS. 14 and 15 are system configuration diagrams for explaining synchronization of the inherited data conducted by the storage device controller 100 according to this embodiment.

In the storage device controller 100 shown in FIGS. 14 and 15, CHN1 (110) and CHN2 (110) form a cluster A (180), and CHN3 (110) and CHN4 (110) form a cluster B (180). That is, CHNs 1 to 4 (110) are classified into clusters A and B (180). CHNs 110 are connected to one another while each CHN 110 is connected to the information processors 200 through the LAN 400. Each CHN 110 is connected to the shared memory 120, system LUs, a user LU and the management terminal 160 through the connection portion 150. FIG. 14 shows the case where the system LUs are assigned to CHNs 110 respectively. That is, the system LUs shown in FIG. 14 are also local LUs. Incidentally, each NAS control software shown in FIGS. 14 and 15 contains a failure management program 705.

FIG. 15 shows the case where LUs provided in the storage system 600 are classified into local LUs (local volumes), shared LUs (shared volumes) and a global shared LU (second shared volume). The local LUs are LUs allowed to be accessed by CHNs 110 individually and respectively. Each of the shared LUs is an LU allowed to be accessed commonly by a plurality of CHNs 110 belonging to a cluster. The global shared LU is an LU allowed to be accessed commonly by all CHNs 110 in the storage system 600.

As described above, the inherited data for fail-over may contain data such as NFS user data generated individually in accordance with CHNs 110, and data such as system administrator data used in common with all CHNs 110 in the storage system 600. Therefore, in the storage device controller 100 according to this embodiment, the inherited data are synchronized by different methods according to the kind of the inherited data. FIG. 16 shows a synchronizing method management table for indicating correspondence between data handed over at the time of fail-over and synchronizing methods according to the embodiment. The synchronizing method management table may be stored in the memory 113 of each CHN 110 or may be stored in the shared memory 120. Or the synchronizing method management table may be stored in the local LU of each CHN 110.

The synchronizing method management table shown in FIG. 16 is configured to contain a "Control Information" field, a "Data Sync Type" field, a "Synchronizing Method" field, a "Synchronous Data" field, and a "Reflection in Local LU" field.

The kind of the inherited data is written in the "Control Information" field. As described above, in this embodiment, examples of the kind of the inherited data written in this field are NSF user data, CIFS user data, system administrator data, fail-over heart beat, IP address of CHN (110), NSF file lock information, and cluster control information. Incidentally, each inherited data is hereinafter also referred to as control information.

The range in which each inherited data is synchronized is written in the "Data Sync Type" field. When "Synchronization In Cluster" is written in this field, it indicates that the inherited data is synchronized in a cluster. That is, the updated inherited data is synchronized between CHNs 110 in a cluster. When "Synchronization In Storage System" is written in this field, it indicates that the inherited data is synchronized in the storage system 600 as a whole. When "Peculiar to System" is written in this field, it indicates that the inherited data need not be synchronized because the inherited data is never updated.

A method for synchronizing each inherited data is written in the "Synchronizing Method" field. When "Network" is written in this field, it indicates that the inherited data updated by a certain CHN 110 is sent to the other CHN 110 through a network by which the CHNs 100 are connected to each other. As the network for connecting the CHNs 110 to each other, the LAN 400 may be used, the connection portion 150 may be used, or the internal LAN 151 may be used. When "Shared LU" is written in this field, it indicates that the inherited data updated by a certain CHN 110 is stored in the shared LU. When "Shared Memory" is written in this field, it indicates that the inherited data updated by a certain CHN 110 is stored in the shared memory. When "–" is written in this field, it indicates that the inherited data need not be synchronized. Although this embodiment has shown that system administrator data and IP address of CHN need not be synchronized because these data are never updated, these data may be synchronized.

A comment etc. concerning each inherited data is written in the "Synchronous Data" field. For example, a filename or the like for specifying the inherited data can be written in this field. The synchronizing method management table may be configured without provision of the "Synchronous Data" field.

The "Reflection in Local LU" field is a field for selecting whether or not the updated inherited data is also written in the local LU of the other CHN 110 allowed to commonly access the shared LU or the shared memory 120 when the updated inherited data is written in the shared LU or the shared memory 120 to thereby be synchronized. When "No" is written in this field, it indicates that the updated inherited data is not written in the local LU of the other CHN 110. Accordingly, in this case, the other CHN 110 can refer to the inherited data by accessing the shared LU or the shared memory 120. When "Yes" is written in this field, it indicates that the updated inherited data is also written in the local LU of the other CHN 110. Accordingly, in this case, the other CHN 110 can refer to the inherited data by accessing its own local LU.

For example, inherited data low in frequency of update but high in frequency of reference may be stored in the local LU as well as being stored in the shared LU or the shared memory 120. Hence, the frequency of access to the shared LU or the shared memory 120 can be reduced so that access competition between CHNs 110 can be reduced. Accordingly, data access performance can be improved. On the other hand, inherited data only temporarily referred to or inherited data updated frequently is arranged not to be reflected in the local LU. As a result, the processing overhead required for reflecting the inherited data in the local LU can be reduced.

In this manner, in the storage device controller 100 according to this embodiment, the inherited data can be synchronized by an optimal method in consideration of characteristic according to the inherited data type at the time of fail-over.

FIG. 17 is a flow chart showing a process for deciding the synchronizing method of data handed over at the time of fail-over according to this embodiment. Incidentally, the following process can be implemented when the CPU 112 executes the failure management program 705 having codes for carrying out various kinds of operations according to this embodiment.

First, control information is generated (S1000). The phrase "control information is generated" means that a request to update inherited data for fail-over is received from another program in the CHN 110, a program in the management terminal 160 or a program in a certain information processor 200. For example, there is the case where NFS user data updated for addition or deletion of an NFS user provided with file access service is received from a certain information processor 200 or the case where a request to update heart beat marks to be periodically updated is received from the other CHN 110 in the cluster 180.

These inherited data may be updated automatically or may be updated manually by the operator's operating the management terminal 160. Or these inherited data may be updated manually on the information processor 200 side when the user uses the setting Web page provided by the NAS manager 706. As the case where these inherited data are updated automatically, for example, there is the case where heart beat marks are updated. As the case where these inherited data are updated manually, for example, there is the case where NFS user data are updated.

Then, referring to the "Data Sync Type" field in the synchronizing method management table, the CPU 112 checks whether the inherited data is data used in either of the other CHN 110 and in the storage system 600 as a whole or not (S1001). When the inherited data needs synchronization with the other CHN 110, the inherited data is written in the local LU of own CHN 110 and the process is terminated (S1002).

On the other hand, when the inherited data is data needing synchronization with the other CHN 110, the CPU 112 refers to the "Data Sync Type" field on the synchronizing method management table to thereby check whether the inherited data is data needing synchronization in the cluster or not (S1003).

When the inherited data is data not needing synchronization in the cluster, the inherited data is written in the global shared LU through the connection portion 150 because the inherited data is data needing synchronization in the storage system 600 as a whole (S1004). As a result, all CHNs 110 in the storage system 600 can refer to the inherited data having the same content. Then, the CPU 112 refers to the "Reflection in Local LU" field on the synchronizing method management table to thereby check whether the inherited data is also reflected in the local LU or not (S1005). When the "Reflection in Local LU" field on the synchronizing method management table shows "No", the process is terminated as it is. On the other hand, when the "Reflection in Local LU" field shows "Yes", the inherited data written in the global shared LU in the step S1004 is also written in the local LUs of the other CHNs 110. In this case, the inherited data is written in respective local LUs of all CHNs 110 in the storage system 600 (S1006). As a result, each CHN 110 can refer to the inherited data by accessing its own local LU, so that each CHN 110 need not access the global shared LU. Because each CHN 110 need not access the global shared LU, the frequency of access competition with the other CHNs 110 can be reduced so that data access performance can be improved.

On the other hand, when making a decision in the step S1003 that the inherited data is data needing synchronization in the cluster, the CPU 112 examines constituent CHNs 110 in the cluster and specifies a CHN 110 to be notified (S1007). That is, the CPU 112 specifies the other CHN 110 belonging to the cluster to which its own CHN 110 belongs. For example, the other CHN 110 can be specified on the basis of its identifier. Then, the CPU 112 refers to the "Synchronizing Method" field on the synchronizing method management table to thereby check whether a network is used in the method for synchronization of the inherited data or not (S1008). When the "Synchronizing Method" field shows any other descriptive content than "Network", the CPU 112 checks whether the shared LU is used for synchronization of the inherited data or not (S1011). When the "Synchronizing Method" field on the synchronizing method management table shows "Shared LU", the step S1011 goes to "Y" and the inherited data is written in the shared LU in the cluster (S1012). As a result, all CHNs 110 in the cluster 180 to which own CHN 110 belongs can refer to the inherited data having the same content.

The other CHN 110 in the cluster is notified of the storage position of the inherited data in the shared LU as occasion demands (S1013). That is, the other CHN 110 in the cluster is notified of meta-data of the inherited data. As a result, the other CHN 110 in the cluster can know the storage position of the inherited data in the shared LU at the time of referring to the inherited data. Incidentally, the storage position may be fixed to a specific position according to the inherited data. In the case of such inherited data, the other CHN 110 need not be notified of the storage position of the inherited data in the shared LU.

Then, the CPU 112 refers to the "Reflection in Local LU" field on the synchronizing method management table to thereby check whether the inherited data is also reflected in the local LU or not (S1014). When the "Reflection in Local LU" field on the synchronizing method management table shows "No", the process is terminated as it is. When the "Reflection in Local LU" field shows "Yes", the inherited data written in the shared LU in the step S1012 is also written in a local LU of the other CHN 110 in the cluster (S1015). As a result, each CHN 110 in the cluster can refer to the inherited data by accessing its own local LU, so that each CHN 110 need not access the shared LU. Because each CHN 110 need not access the shared LU, the frequency of access competition with the other CHN 110 can be reduced so that data access performance can be improved.

On the other hand, when the "Synchronizing Method" field on the synchronizing method management table shows "Shared Memory" in the step S1011, the step S1011 goes to "N" and the inherited data is written in the shared memory 120 (S1016). As a result, all CHNs 110 in the cluster to which own CHN 110 belongs can refer to the inherited data having the same content.

Then, the other CHN in the cluster is notified of the storage position of the inherited data in the shared memory 120 as occasion demands (S1017). That is, the other CHN in the cluster is notified of meta-data of the inherited data. As a result, the other CHN 110 in the cluster can know the storage position of the inherited data in the shared memory 120 at the time of referring to the inherited data. The storage position of the inherited data may be fixed to a specific address according to the inherited data. In the case of such inherited data, the other CHN 110 need not be notified of the storage position of the inherited data in the shared memory 120.

Then, the CPU 112 refers to the "Reflection in Local LU" field on the synchronizing method management table to thereby check whether the inherited data is also reflected in the local LU or not (S1014). When the "Reflection in Local LU" field on the synchronizing method management table shows "No", the process is terminated as it is. When the "Reflection in Local LU" field shows "Yes", the inherited data written in the shared memory 120 in the step S1016 is also written in a local LU of the other CHN 110 in the cluster (S1015). As a result, each CHN 110 in the cluster can refer to the inherited data by accessing its own local LU, so that each CHN 110 need not access the shared memory 120. Because each CHN 110 need not access the shared memory 120, the frequency of access competition with the other CHN 110 can be reduced so that data access performance can be improved.

On the other hand, when the "Synchronizing Method" field on the synchronizing method management table shows "Network" in the step S1008, the step S1008 goes to "Y". First, the inherited data is written in the local LU of own CHN 110 (S1009). Then, the inherited data written in the local LU of own CHN 110 is also sent to the other CHN 110 in the cluster through a network (S1010). As a result, the inherited data is also reflected in a local LU of the other CHN 110 in the cluster, so that the content of the inherited data stored in the local LU of own CHN 110 can be made identical to the content of the inherited data stored in the local LU of the other CHN 110 in the cluster.

In this manner, in the storage device controller 100 according to this embodiment, synchronization of the inherited data at the time of fail-over can be made by an optimal method in consideration of characteristic according to the inherited data type. Because the inherited data is synchronized, there is no data that needs to be handed over after failure occurs in a certain CHN 110, so that fail-over can be carried out speedily.

A process for referring to the inherited data will be described below. The process for referring to the inherited data is implemented when the CPU 112 executes the failure management program 705 having codes for carrying out various kinds of operations according to this embodiment. The CPU 112 can know the storage destination (reference destination) of the inherited data by referring to an inherited data reference table shown in FIG. 18. The inherited data reference table may be stored in the memory 113 of each CHN 110 or may be stored in the shared memory 120. Or the inherited data reference table may be stored in the local LU of each CHN 110.

The inherited data reference table shown in FIG. 18 contains a "Control Information" field, a "Storage Destination of Data" field, and a "Notice of Data" field.

The inherited data type is written in the "Control Information" field. In this embodiment, examples of the inherited data type written in this field are NFS user data, CIFS user data, system administrator data, fail-over heart beat, NFS file lock information, and cluster control information.

The storage destination (reference destination) of the inherited data is written in the "Storage Destination of Data" field. When. "Local LU" is written in this field, it indicates that the inherited data is stored in the local LU of own CHN 110. That is, "Local LU" indicates that the inherited data is stored in the local LU of own CHN 110 because the inherited data is sent through a network or written in the local LU of own CHN 110 when the inherited data is updated by the other CHN 110. When "Shared LU" is written in this field, it indicates that the inherited data is stored in the shared LU allowed to be used in common with CHNs 110 in the cluster 180 to which own CHN 110 belongs. When "Global Shared LU" is written in this field, it indicates that the inherited data is stored in the global shared LU allowed to be used in common with all CHNs 110 in the storage system 600. When "Shared Memory" is written in this field, it indicates that the inherited data is stored in the shared memory 120.

Whether or not notification of the storage position of the inherited data is received from the other CHN 110 updating the inherited data is written in the "Notice of Data" field. When "Yes" is written in this field, it indicates that notification is received. When "No" is written in this field, it indicates that notification is not received. When "–" is written in this field, it indicates that notification is unrelated. When the inherited data is NFS user data, the other CHN 110 sends the data through a network on the basis of the synchronizing method management table shown in FIG. 16. For this reason, no notification of the storage position of the NSF user data is made by the other CHN 110 because own CHN 110 stores the NFS user data in the local LU of own CHN 110.

In this manner, in the storage device controller 100 according to this embodiment, each CHN 110 can know the storage destination of inherited data by referring to the inherited data reference table.

Figure 19:
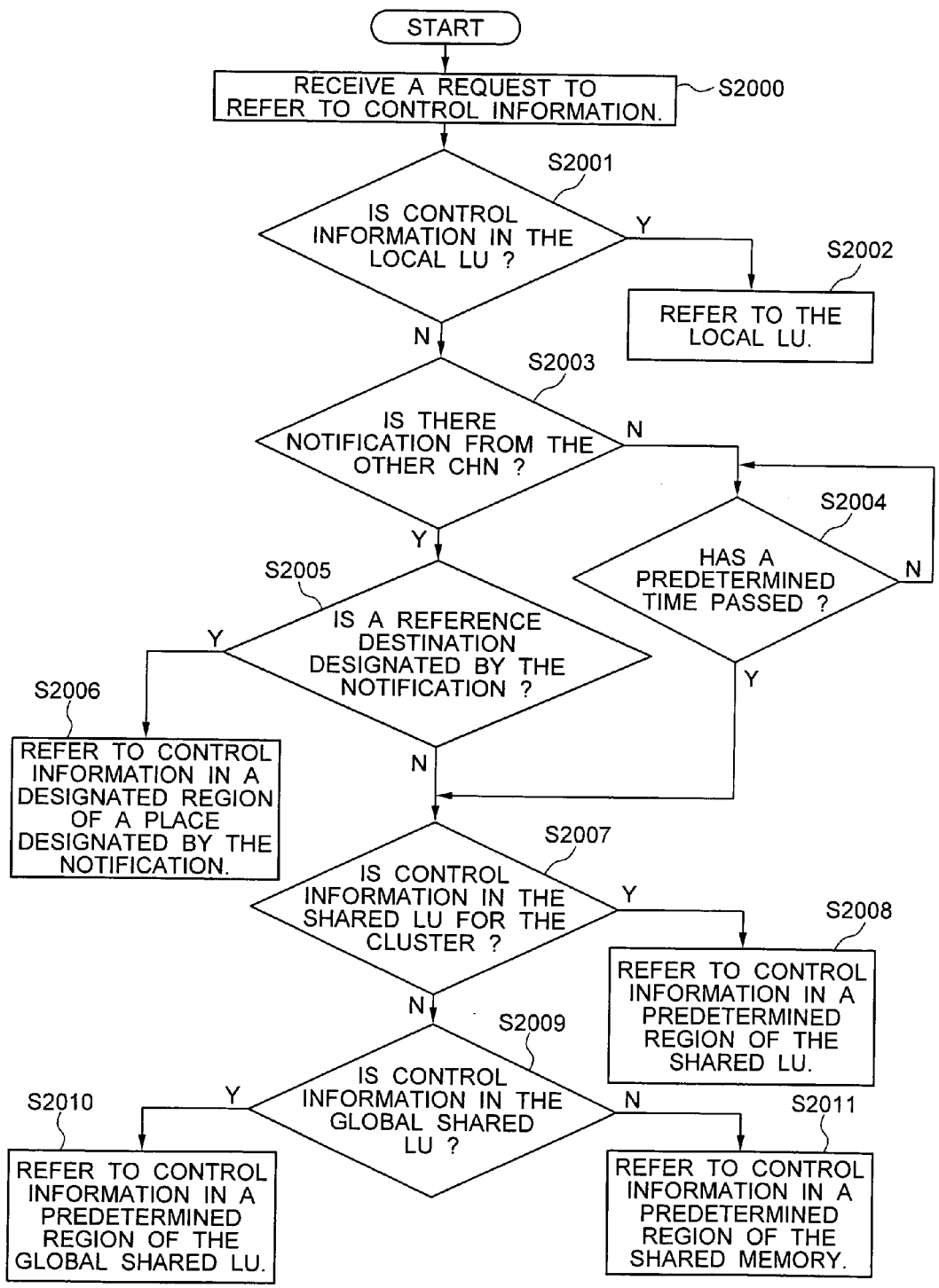
FIG. 19 is a flow chart showing a process for determining the designations for referring to data to be handed over at the time of fail-over in this embodiment.

FIG. 19 is a flow chart showing a process for referring to data handed over at the time of fail-over according to this embodiment.

First, a request to refer to inherited data is received (S2000). The request to refer to inherited data is received from another program of CHN 110, a program in the management terminal 160 or a program in a certain information processor 200. For example, there is the case where the request is received from a certain information processor 200 for the purpose of addition or deletion of an NFS user provided with file access service or the case where the request to refer to inherited data is received for the purpose of confirmation of heart beat marks of the other CHN 110 in the cluster 180.

Then, the CPU 112 refers to the "Storage Destination of Data" field on the inherited data reference table to thereby check whether the inherited data is stored in the local LU or not (S2001). When the "Storage Destination of Data" field shows "Local LU", the CPU 112 refers to the inherited data by accessing the local LU of its own CHN 110 (S2002). The CPU 112 can know the storage position of the inherited data by referring to meta-data.

When the "Storage Destination of Data" field shows any other descriptive content than "Local LU", the inherited data is in any one of the shared LU, the shared memory and the global shared LU. Therefore, first, the CPU 112 refers to the "Notice of Data" field on the inherited data reference table to thereby check whether notification concerning the inherited data is received from the other CHN 110 or not (S2003).

When notification is not received, the inherited data is stored in any one of predetermined storage positions of the shared LU, the shared memory and the global shared LU. Therefore, the CPU 112 refers to these predetermined positions periodically to thereby check whether the inherited data is updated or not. Incidentally, the predetermined storage positions may be recorded in the inherited data reference table or may be recorded in another table than the inherited data reference table.

After the CPU 112 waits for passage of a predetermined time in step S2004, the CPU 112 refers to the "Storage Destination of Data" field on the inherited data reference table to thereby check whether the inherited data is stored in the shared LU in the cluster or not (S2007). When the "Storage Destination of Data" field shows "Shared LU", the CPU 112 reads the inherited data by accessing the predetermined storage position of the shared LU (S2008). Then, the CPU 112 refers to the "Storage Destination of Data" field on the inherited data reference table to thereby check whether the inherited data is stored in the global shared LU or not (S2009). When the "Storage Destination of Data" field shows "Global Shared LU", the CPU 112 reads the inherited data by accessing the predetermined storage position of the global shared LU (S2010). When the "Storage Destination of Data" field shows "Shared Memory", the CPU 112 reads the inherited data by accessing the predetermined storage position of the shared memory (S2011).

On the other hand, when notification concerning the inherited data is received from the other CHN 110 in the step S2003, the CPU 112 checks whether the storage position of the inherited data is designated by the notification or not (S2005). When the storage position of the inherited data is designated, the CPU 112 reads the inherited data from the designated position of the shared memory, the shared LU or the global shared LU (S2006).

When the storage position of the inherited data is not designated, the inherited data is stored in a predetermined position of any one of the shared LU, the shared memory and the global shared LU. Therefore, the CPU 112 refers to the "Storage Destination of Data" field on the inherited data reference table to thereby check whether the inherited data is stored in the shared LU in the cluster or not (S2007). Hereinafter, the same processing as the aforementioned processing is carried out.

In this manner, in the storage device controller 100 according to this embodiment, because the aforementioned process is carried out with reference to the inherited data reference table, fail-over inherited data stored in various positions in accordance with the data type can be read appropriately.

Figure 20:
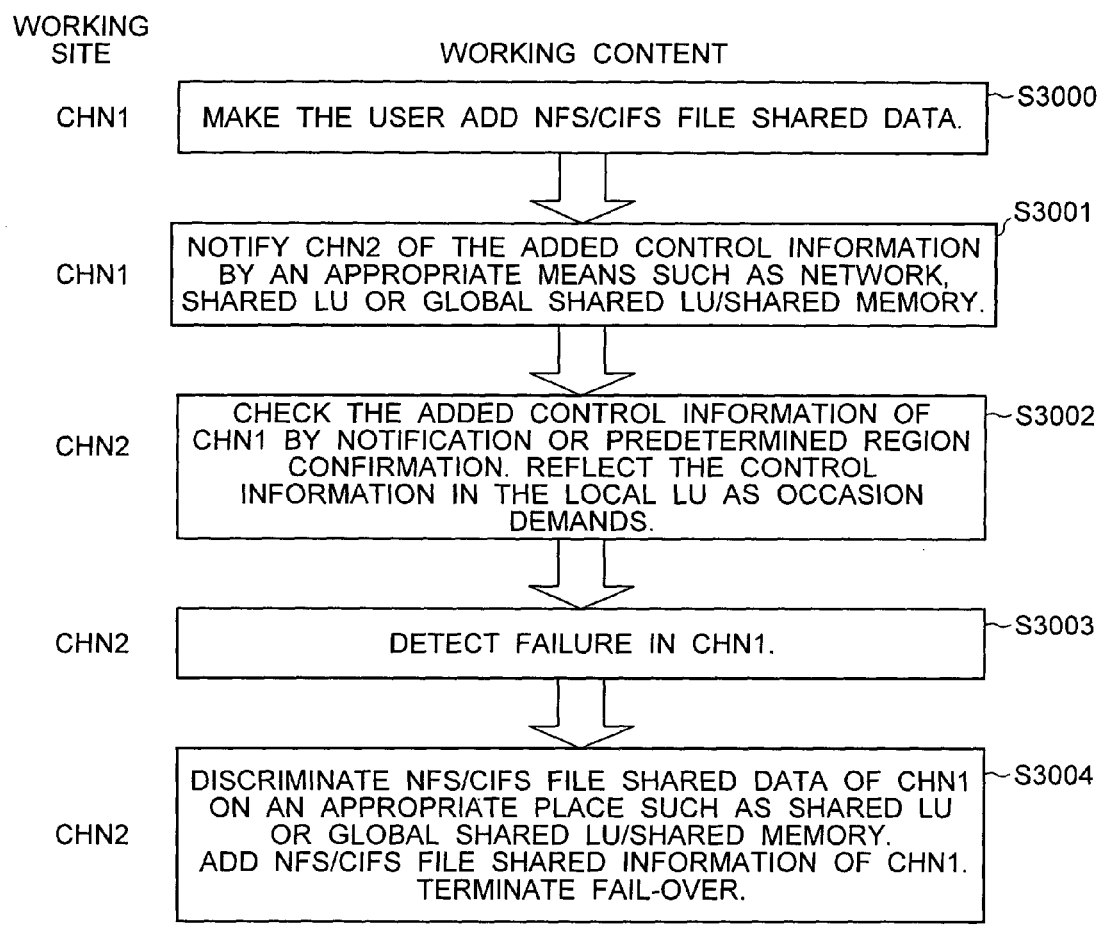
FIG. 20 is a flow chart showing a fail-over process in this embodiment.

FIG. 20 is a flow chart showing fail-over control according to this embodiment. The CPU 112 included in a CHN 110 executes the failure management program 705 having codes for carrying out various kinds of operations to thereby implement the fail-over control.

As shown in FIG. 11, the fail-over control is carried out between constituent CHNs 110 of a cluster 180. The fail-over control is carried out according to an instruction (fail-over execution request) given from the NAS manager 706 as well as the fail-over control is carried out when failure occurs in a CHN 110. FIG. 20 shows an example of the fail-over control in the case where failure occurs in CHN1 (110) in a cluster constituted by CHN1 (110) and CHN2 (110).

First, NFS/CIFS file shared data are added by the user (S3000). The term "NFS/CIFS file shared data" means data that are allowed to be accessed by an information processor 200 in which the UNIX (registered trademark) operating system is operated or by an information processor 200 in which the Windows (registered trademark) operating system is operated, through the LAN 400. The phrase "NFS/CIFS file shared data are added" means that NFS/CIFS file shared data are newly written in an LU by CHN1 (110). At the same time, meta-data corresponding to the NFS/CIFS file shared data is written in the LU. In addition, NFS file lock information is also updated.

Then, CHN1 (110) carries out the step of synchronizing the NFS file lock information (S3001). As written in the "Synchronizing Method" field on the synchronizing method management table shown in FIG. 16, the NFS file lock information is stored in the shared LU. Therefore, CHN1 (110) updates the NFS file lock information stored in the shared LU. Incidentally, as written in the "Reflection in Local LU" field on the synchronizing method management table, the NFS file lock information is not reflected in the local LU of the other CHN (110) in the cluster.

Then, in step S3002, CHN2 (110) checks the updated NFS file lock information. CHN2 (110) may reflect the updated NFS file lock information in its own local LU as occasion demands.

CHN2 (110) checks heart beat marks of CHN1 (110). When the heart beat marks are not updated though a predetermined time has passed or when a code indicating occurrence of failure is found from the heart beat marks, CHN2 (110) starts a fail-over process (S3003). The heat beat marks are data that are written in the shared memory 120 by both CHN1 (110) and CHN2 (110) so that each of CHN1 (110) and CHN2 (110) can check the operating state of the other.

In step S3004, CHN2 (110) can recognize the fact that the NFS file lock information is stored in the shared LU, by referring to the "Storage Destination of Data" field on the inherited data reference table. CHN2 (110) can also recognize the fact that there is no notification, by referring to the "Notice of Data" field on the inherited data reference table. CHN2 (110) can recognize the fact that the NFS file lock information is stored in a predetermined storage position of the shared LU, on the basis of the fact that there is no notification. Accordingly, CHN2 (110) can read the NFS file lock information from the predetermined storage position of the shared LU. In this manner, CHN2 (110) can inherit the NFS file lock information from CHN1 (110). Other inherited data can be handed over from CHN1 (110) to CHN2 (110) in the same manner as described above by referring to the inherited data reference table. As a result, file access service that has been provided to the information processor 200 by CHN1 (110) until then can be provided by CHN2 (110) succeedingly. Thus, fail-over is completed (S3004).

In this manner, in the storage device controller 100 according to this embodiment, because inherited data are synchronized, a troublesome data handover process need not be carried out after failure occurs in a CHN 110. Accordingly, fail-over can be carried out speedily. Further, the synchronizing process can be carried out by an optimal method in consideration of characteristic according to the inherited data type at the time of fail-over. For example, inherited data that needs synchronization only with CHNs 110 in a cluster is written in the shared LU, and inherited data that needs synchronization with all CHNs 110 in the storage system 600 is written in the global shared LU. The inherited data written in the shared LU may be also written in the local LU of the other CHN 110. As a result, each CHN 110 can refer to the inherited data by accessing its own local LU. Accordingly, because each CHN 110 need not access the shared LU, the frequency of access competition with the other CHN 110 can be reduced, so that data access performance can be improved.

In addition, in the storage device controller 100 according to this embodiment, because the inherited data can be referred to while the inherited data reference table is referred to, fail-over inherited data stored in various positions according to the inherited data type can be read appropriately.

Although the embodiment has been described above, the embodiment is provided for facilitating understanding of the invention but not for interpreting the invention restrictively. The invention may be changed or modified without departing from the gist of the invention, and may contain changes or modifications equivalent thereto.

What is claimed is:

1. A storage device controller comprising:
    a plurality of channel control portions each including a circuit board on which a file access processing portion for receiving file-by-file data input/output requests sent from information processors and an I/O processor for outputting I/O requests corresponding to said data input/output requests to storage devices are formed, said channel control portions being classified into groups for the sake of fail-over; and
    a processing portion configured to decide that data regarding at least one IP address set for said channel control portions to provide NAS service to said information processors are stored in a shared volume which is a storage region logically set on physical storage regions provided by said storage devices and which can be accessed commonly by any other channel control portion belonging to the same group to carry out fail-over, wherein said storage device controller comprises a management table for storing synchronization type information and synchronization method information based on the type of data processed by said channel control portions, wherein said channel control portions are clustered into a plurality of groups associated with the fail-over thereby making it possible to send updated inherited data including an IP address to be inherited to channel control portions within the same group, whereby a successor channel control portion belonging to the same group as a predecessor channel control portion takes over, by referring to said management table based on the type of data processed by said predecessor channel control portion, the IP address of said predecessor channel control portion to receive data that have been previously received by said predecessor channel control portion prior to failure thereof.

2. A storage device controller according to claim 1, wherein:
    local volumes which are storage regions logically set on said physical storage regions provided by said storage devices and which can be accessed by said channel control portions individually and respectively are assigned to said channel control portions respectively; and
    said processing portion further decides that said data are stored in said local volume of the other channel control portion belonging to the same group as said channel control portion updating said data.

3. A storage device controller according to claim 1, wherein:
local volumes which are storage regions logically set on said physical storage regions provided by said storage devices and which can be accessed by said channel control portions individually and respectively are assigned to said channel control portions respectively;
said processing portion further decides that said data are stored in said local volume of the other channel control portion belonging to the same group as said channel control portion updating said data;
said storage device controller further comprises an inherited data reference table on which reference destinations of said data are recorded; and
said processing portion reads said data from any one of said shared volume, said shared memory and said local volumes on the basis of said reference destinations of said data recorded in said inherited data reference table.

4. A storage device controller according to claim 1, wherein said processing portion stores said data in a second shared volume which is a storage region logically set on physical storage regions provided by said storage devices and which can be accessed commonly by all said channel control portions in said storage device controller when said data are shared data allowed to be referred to by all said channel control portions in said storage device controller.

5. A storage device controller according to claim 1, wherein said data handed over at the time of said fail-over contain at least one of NFS user data, CIFS user data, system administrator data, fail-over heart beat, IP address of a channel control portion, NFS file lock information and cluster control information.

6. A storage device controller comprising:
a plurality of channel control portions each including a circuit board on which a file access processing portion for receiving file-by-file data input/output requests sent from information processors and an I/O processor for outputting I/O requests corresponding to said data input/output requests to storage devices are formed, said channel control portions being classified into groups for the sake of fail-over; and
a processing portion configured to decide that data regarding at least one IP address set for said channel control portions to provide NAS service to said information processors are stored in a shared memory which is contained in said storage device controller and which can be accessed commonly by said channel control portions to carry out fail-over, wherein said storage device controller comprises a management table for storing synchronization type information and synchronization method information based on the type of data processed by said channel control portions, wherein said channel control portions are clustered into a plurality of groups associated with the fail-over thereby making it possible to send updated inherited data including an IP address to be inherited to channel control portions within the same group, whereby a successor channel control portion belonging to the same group as a predecessor channel control portion takes over, by referring to said management table based on the type of data processed by said predecessor channel control portion, the IP address of said predecessor channel control portion to receive data that have been previously received by said predecessor channel control portion prior to failure thereof.

7. A storage device controller comprising:
a plurality of channel control portions each including a circuit board on which a file access processing portion for receiving file-by-file data input/output requests sent from information processors and an I/O processor for outputting I/O requests corresponding to said data input/output requests to storage devices are formed, said channel control portions being classified into groups for the sake of fail-over; and
a processing portion configured to decide that data regarding at least one IP address set for said channel control portions to provide NAS service to said information processors are sent to another channel control portion belonging to the same group, through a network connecting said channel control portions to one another, to carry out fail-over, wherein said storage device controller comprises a management table for storing synchronization type information and synchronization method information based on the type of data processed by said channel control portions, wherein said channel control portions are clustered into a plurality of groups associated with the fail-over thereby making it possible to send updated inherited data including an IP address to be inherited to channel control portions within the same group, whereby said another channel control portion belonging to the same group as a predecessor channel control portion takes over, by referring to said management table based on the type of data processed by said predecessor channel control portion, the IP address of said predecessor channel control portion to receive data that have been previously received by said predecessor channel control portion prior to failure thereof.

8. A storage device controller according to claim 7, wherein said processing portion sends said data to all said channel control portions in said storage device controller through said network when said data are shared data allowed to be referred to by all said channel control portions in said storage device controller.

9. A control method for a storage device controller including a plurality of channel control portions each having a circuit board on which a file access processing portion for receiving file-by-file data input/output requests sent from information processors and an I/O processor for outputting I/O requests corresponding to said data input/output requests to storage devices are formed, said channel control portions being classified into groups for the sake of fail-over, said control method comprising deciding that data regarding at least one IP address set for said channel control portions to provide NAS service to said information processors are stored in a shared volume which is a storage region logically set on physical storage regions provided by said storage devices and which can be accessed commonly by any other channel control portion belonging to the same group to carry out fail-over, wherein said storage device controller comprises a management table for storing synchronization type information and synchronization method information based on the type of data processed by said channel control portions, wherein said channel control portions are clustered into a plurality of groups associated with the fail-over thereby making it possible to send updated inherited data including an IP address to be inherited to channel control portions within the same group, whereby a successor channel control portion belonging to the same group as a predecessor channel control portion takes over, by referring to said management table based on the type of data processed by said predecessor channel control portion, the IP address of said predecessor channel control portion to receive data that have been previously received by said predecessor channel control portion prior to failure thereof.

10. A control method for a storage device controller according to claim 9, wherein:

local volumes which are storage regions logically set on said physical storage regions provided by said storage devices and which can be accessed by said channel control portions individually and respectively are assigned to said channel control portions respectively; and said control method further comprises storing said data in said local volume of the other channel control portion belonging to the same group as said channel control portion updating said data.

11. A control method for a storage device controller according to claim 9, wherein:

local volumes which are storage regions logically set on said physical storage regions provided by said storage devices and which can be accessed by said channel control portions individually and respectively are assigned to said channel control portions respectively;

said control method further comprises:

storing said data in said local volume of the other channel control portion belonging to the same group as said channel control portion updating said data;

referring to an inherited data reference table on which reference destinations of said data are recorded; and reading said data from any one of said shared volume, said shared memory and said local volumes on the basis of said reference destinations of said data recorded in said inherited data reference table.

12. A control method for a storage device controller according to claim 9, further comprising storing said data in a second shared volume which is a storage region logically set on physical storage regions provided by said storage devices and which can be accessed commonly by all said channel control portions in said storage device controller when said data are shared data allowed to be referred to by all said channel control portions in said storage device controller.

13. A control method for a storage device controller according to claim 9, wherein said data handed over at the time of said fail-over contain at least one of NFS user data, CIFS user data, system administrator data, fail-over heart beat, IP address of a channel control portion, NFS file lock information and cluster control information.

14. A control method for a storage device controller including a plurality of channel control portions each having a circuit board on which a file access processing portion for receiving file-by-file data input/output requests sent from information processors and an I/O processor for outputting I/O requests corresponding to said data input/output requests to storage devices are formed, said channel control portions being classified into groups for the sake of fail-over, said control method comprising deciding that data regarding at least one IP address set for said channel control portions to provide NAS service to said information processors are stored in a shared memory which is contained in said storage device controller and which can be accessed commonly by said channel control portions to carry out fail-over, wherein said storage device controller comprises a management table for storing synchronization type information and synchronization method information based on the type of data processed by said channel control portions, wherein said channel control portions are clustered into a plurality of groups associated with the fail-over thereby making it possible to send updated inherited data including an IP address to be inherited to channel control portions within the same group, whereby a successor channel control portion belonging to the same group as a predecessor channel control portion takes over, by referring to said management table based on the type of data processed by said predecessor channel control portion, the IP address of said predecessor channel control portion to receive data that have been previously received by said predecessor channel control portion prior to failure thereof.

15. A control method for a storage device controller including a plurality of channel control portions each having a circuit board on which a file access processing portion for receiving file-by-file data input/output requests sent from information processors and an I/O processor for outputting I/O requests corresponding to said data input/output requests to storage devices are formed, said channel control portions being classified into groups for the sake of fail-over, said control method comprising sending data regarding at least one IP address set for said channel control portions to provide NAS service to said information processors to another channel control portion belonging to the same group, through a network connecting said channel control portions to one another, to carry out fail-over, wherein said storage device controller comprises a management table for storing synchronization type information and synchronization method information based on the type of data processed by said channel control portions, wherein said channel control portions are clustered into a plurality of groups associated with the fail-over thereby making it possible to send updated inherited data including an IP address to be inherited to channel control portions within the same group, whereby said another channel control portion belonging to the same group as a predecessor channel control portion takes over, by referring to said management table based on the type of data processed by said predecessor channel control portion, the IP address of said predecessor channel control portion to receive data that have been previously received by said predecessor channel control portion prior to failure thereof.

16. A control method for a storage device controller according to claim 15, further comprising sending said data to all said channel control portions in said storage device controller through said network when said data are shared data allowed to be referred to by all said channel control portions in said storage device controller.

* * * * *